(12) United States Patent
Hattori et al.

(10) Patent No.: US 10,858,135 B2
(45) Date of Patent: Dec. 8, 2020

(54) INDUSTRIAL CONTROL APPARATUS, CONTROL METHOD, PROGRAM, PACKAGING MACHINE, AND PACKAGING MACHINE CONTROL APPARATUS

(71) Applicant: OMRON Corporation, Kyoto (JP)

(72) Inventors: Reiko Hattori, Souraku-gun (JP); Akira Nakajima, Otsu (JP); Hiroki Koyama, Nagaokakyo (JP)

(73) Assignee: OMRON Corporation, Kyoto (JP)

( * ) Notice: Subject to any disclaimer, the term of this patent is extended or adjusted under 35 U.S.C. 154(b) by 15 days.

(21) Appl. No.: 15/922,996

(22) Filed: Mar. 16, 2018

(65) Prior Publication Data

US 2018/0297731 A1    Oct. 18, 2018

(30) Foreign Application Priority Data

Apr. 14, 2017  (JP) .................................. 2017-080956

(51) Int. Cl.
*B65B 57/10* (2006.01)
*G05B 23/02* (2006.01)
(Continued)

(52) U.S. Cl.
CPC .............. *B65B 57/10* (2013.01); *B65B 9/087* (2013.01); *B65B 35/24* (2013.01); *B65B 41/12* (2013.01);
(Continued)

(58) Field of Classification Search
None
See application file for complete search history.

(56) References Cited

U.S. PATENT DOCUMENTS 4,964,258 A    10/1990   Seko et al.
6,330,351 B1 * 12/2001  Yasunaga ........... G01N 21/9508
                                                235/375
(Continued)

FOREIGN PATENT DOCUMENTS

CN        1690898 A    11/2005
CN      102129199 A     7/2011
(Continued)

OTHER PUBLICATIONS

The Office Action dated Aug. 21, 2018 in a counterpart Japanese patent application.
(Continued)

*Primary Examiner* — Mohammad Ali
*Assistant Examiner* — David Earl Ogg
(74) *Attorney, Agent, or Firm* — Metrolex IP Law Group, PLLC.

(57) ABSTRACT

A control apparatus for controlling a production or manufacturing apparatus that performs processing for sequentially producing an item to be produced through units arranged in a line, includes: a physical quantity acquirer that acquires a physical quantity representing a state of processing in a unit subjected to monitoring for each cycle, the cycle being defined as unit processing time of processing performed by each unit; an abnormality determiner that determines occurrence of an abnormality in the unit, based on the physical quantity or a feature value extracted from the physical quantity; and a control instructor that specifies, when it is determined that an abnormality occurs in the unit, a cycle during which a downstream unit performs processing on an item to be produced that is affected by the abnormality, and perform control so that abnormality handling processing is performed as processing in the specified cycle by the downstream unit.

9 Claims, 20 Drawing Sheets

(51) Int. Cl.
*B65B 9/087* (2012.01)
*B65B 35/24* (2006.01)
*B65B 41/12* (2006.01)
*B65B 61/02* (2006.01)
*G05B 19/418* (2006.01)

(52) U.S. Cl.
CPC ...... *B65B 61/025* (2013.01); *G05B 19/41875* (2013.01); *G05B 23/0227* (2013.01); *G05B 23/0286* (2013.01); *G05B 2219/32368* (2013.01)

(56) References Cited

U.S. PATENT DOCUMENTS

| | | | | |
|---|---|---|---|---|
| 7,657,339 | B1* | 2/2010 | Retersdorf | G05B 19/41875 700/108 |
| 7,715,935 | B2* | 5/2010 | Vogeley, Jr. | A22C 7/00 100/137 |
| 8,108,061 | B2* | 1/2012 | Lee | G05B 19/41875 700/111 |
| 8,373,081 | B2* | 2/2013 | Ackley | B07C 5/3422 209/580 |
| 9,911,071 | B2* | 3/2018 | Collombet | G06K 19/00 |
| 2005/0238043 | A1 | 10/2005 | Altpeter | |
| 2005/0286916 | A1* | 12/2005 | Nakazato | G03G 15/6573 399/16 |
| 2010/0256793 | A1* | 10/2010 | Lee | G05B 19/41875 700/108 |
| 2011/0176159 | A1 | 7/2011 | Ohshima et al. | |
| 2014/0343719 | A1 | 11/2014 | Collombet et al. | |
| 2016/0005298 | A1* | 1/2016 | Takahashi | G08B 21/187 340/679 |
| 2016/0052764 | A1* | 2/2016 | Fuhrer | G06T 7/0004 348/143 |

FOREIGN PATENT DOCUMENTS

| | | |
|---|---|---|
| JP | H2-162401 A | 6/1990 |
| JP | H5-20651 Y2 | 5/1993 |
| JP | H7-106734 B2 | 11/1995 |
| JP | 2014-237476 A | 12/2014 |
| JP | 2015-193413 A | 11/2015 |
| JP | 2016-120932 A | 7/2016 |
| TW | 201335046 A1 | 9/2013 |

OTHER PUBLICATIONS

The Office Action dated Apr. 10, 2018 in a counterpart Japanese patent application.

* cited by examiner (Tdf<Td)

(Tdb>Td)

INDUSTRIAL CONTROL APPARATUS, CONTROL METHOD, PROGRAM, PACKAGING MACHINE, AND PACKAGING MACHINE CONTROL APPARATUS

CROSS-REFERENCES TO RELATED APPLICATIONS

This application claims priority to Japanese Patent Application No. 2017-080956 filed Apr. 14, 2017, the entire contents of which are incorporated herein by reference.

FIELD

The disclosure relates to an industrial control apparatus, control method, and program for controlling a production apparatus that continuously produces products such as a packaging machine, a laminating apparatus, or an assembly apparatus, and also relates to a packaging machine and a packaging machine control apparatus.

BACKGROUND

Conventionally, production apparatuses are used to continuously and rapidly mass-produce the same type of identical products or semi-finished products of the same quality.

Examples of this kind of production apparatus vary in many very ways, and include a manufacturing line for an industrial product such as an automobile or a semiconductor device, a packaging machine for packaging goods such as foods, sweets, medicines, or stationery, and a printer for printing on newspapers, magazines, or books.

These production apparatuses can continuously produce products or semi-finished products with speed and quality that are determined as per the performance of the production apparatuses, if they are working normally.

However, if some kind of issue occurs in a production apparatus, there is a concern that the production ability will be degraded, and moreover, the production quality will be adversely affected.

JP H2-162401A discloses a method by which, if an abnormality has occurred in an automatic apparatus, the apparatus is instructed to stop and is thus completely stopped.

JP H2-162401A is an example of background art.

However, if the entire production apparatus is stopped every time an abnormality has occurred, the availability of the production apparatus will be degraded.

One or more aspects have been made in view of the foregoing situation, and aims to provide an industrial control apparatus, control method, program, and packaging machine control apparatus with which, if an abnormality has occurred in a unit that is subjected to monitoring, continuous production processing is continued while preventing the abnormality from affecting the entire production apparatus, thereby keeping high production efficiency, and also to provide a packaging machine that is controlled by the industrial control apparatus.

SUMMARY

To achieve the above-stated object, one or more aspects may take the following measures.

That is to say, a first aspect is an industrial control apparatus for controlling a production apparatus that performs processing for sequentially producing an item to be produced through a plurality of units that are arranged in a line from an upstream side toward a downstream side, the industrial control apparatus including: a physical quantity acquirer configured to acquire a physical quantity that represents a state of processing in a unit that is subjected to monitoring, of the plurality of units, for each cycle, a cycle being defined as a unit of processing time of processing performed by each of the plurality of units; an abnormality determiner configured to determine occurrence of an abnormality in the unit that is subjected to monitoring, based on the acquired physical quantity or a feature value that is extracted from the physical quantity; and a control instructor configured to specify, in a case where it is determined that an abnormality has occurred in the unit that is subjected to monitoring, a cycle during which a downstream unit performs processing on an item to be produced that is affected by the abnormality, and perform control so that abnormality handling processing is performed as processing in the specified cycle by the downstream unit.

A second aspect is the control apparatus according a first aspect further including a storage configured to store, in a case where there are a plurality of units that are subjected to monitoring, cycle-specific information for specifying a cycle during which the downstream unit performs processing on the item to be produced that is affected by the abnormality, in association with each of the units that are subjected to monitoring, wherein, in a case where it is determined that an abnormality has occurred in one of the plurality of units that are subjected to monitoring, the control instructor reads out, from the storage, the cycle-specific information that corresponds to the unit in which the abnormality occurred, and performs control based on the read cycle-specific information so that the abnormality handling processing is performed as processing in the specified cycle by the downstream unit.

A third aspect is the control apparatus according to a first aspect in which the control instructor obtains the number of cycles in which the downstream unit performs processing in a period from a time point at which the occurrence of the abnormality is determined in the unit that is subjected to monitoring until when the downstream unit performs processing on the item to be produced that is affected by the abnormality, and performs control so that the abnormality handling processing is performed as processing by the downstream unit during the next cycle of the obtained number of cycles.

A fourth aspect is a packaging machine control apparatus for controlling a packaging machine that performs processing for sequentially packaging an item to be produced through a plurality of units that are arranged in a line from an upstream side toward a downstream side, the packaging machine control apparatus including: a physical quantity acquirer configured to acquire a physical quantity that represents a state of processing in a unit that is subjected to monitoring, of the plurality of units, for each cycle, a cycle being defined as a unit of processing time of processing performed by each of the plurality of units; an abnormality determiner configured to determine occurrence of an abnormality in the unit that is subjected to monitoring, based on the acquired physical quantity or a feature value that is extracted from the physical quantity; and a control instructor configured to specify, in a case where it is determined that an abnormality has occurred in the unit that is subjected to monitoring, a cycle during which a downstream unit performs processing on an item to be produced that is affected by the abnormality, and perform control so that abnormality handling processing is performed as processing in the specified cycle by the downstream unit.

A fifth aspect is a control method to be performed by an industrial control apparatus for controlling a production apparatus that performs processing for sequentially producing an item to be produced through a plurality of units that are arranged in a line from an upstream side toward a downstream side, the method including: acquiring a physical quantity that represents a state of processing in a unit that is subjected to monitoring, of the plurality of units, for each cycle, a cycle being defined as a unit of processing time of processing performed by each of the plurality of units; determining occurrence of an abnormality in the unit that is subjected to monitoring, based on the acquired physical quantity or a feature value that is extracted from the physical quantity; and performing control to specify, in a case where it is determined that an abnormality occurs in the unit that is subjected to monitoring, a cycle during which a downstream unit performs processing on an item to be produced that is affected by the abnormality, and perform control so that abnormality handling processing is performed as processing in the specified cycle by the downstream unit.

A sixth aspect is a program for causing a computer to function as each of the portions included in the control apparatus according to any one of first and third aspects.

A seventh aspect is a packaging machine, which is the production apparatus that includes the industrial control apparatus according to any one of first to third aspects and is controlled by the industrial control apparatus.

According to first, fourth, fifth, sixth, and seventh aspects, if an abnormality has occurred in a unit that is subjected to monitoring, abnormality handling processing is performed in units downstream of that unit only on an item to be produced that has been affected by this abnormality, and normal processing is performed on other items to be produced. Accordingly, even if an abnormality has occurred in the unit that is subjected to monitoring, operations can be continued without stopping the processing of the entire production apparatus such as a packaging machine, and thus, high availability of the production apparatus can be maintained.

According to a second aspect, even if there are a plurality of units that are subjected to monitoring, the abnormality handling processing can be performed during a cycle in which the item to be produced that has been affected by the abnormality is processed in downstream units only by reading out, from the storage, the cycle-specific information that is stored in advance in association with these units.

According to a third aspect, the abnormality handling processing can be performed in the downstream units simply by managing the number of cycles, without performing precise time management.

DETAILED DESCRIPTION

Hereinafter, the best modes for carrying out one or more embodiments will be described with reference to the drawings.

Figure 1:
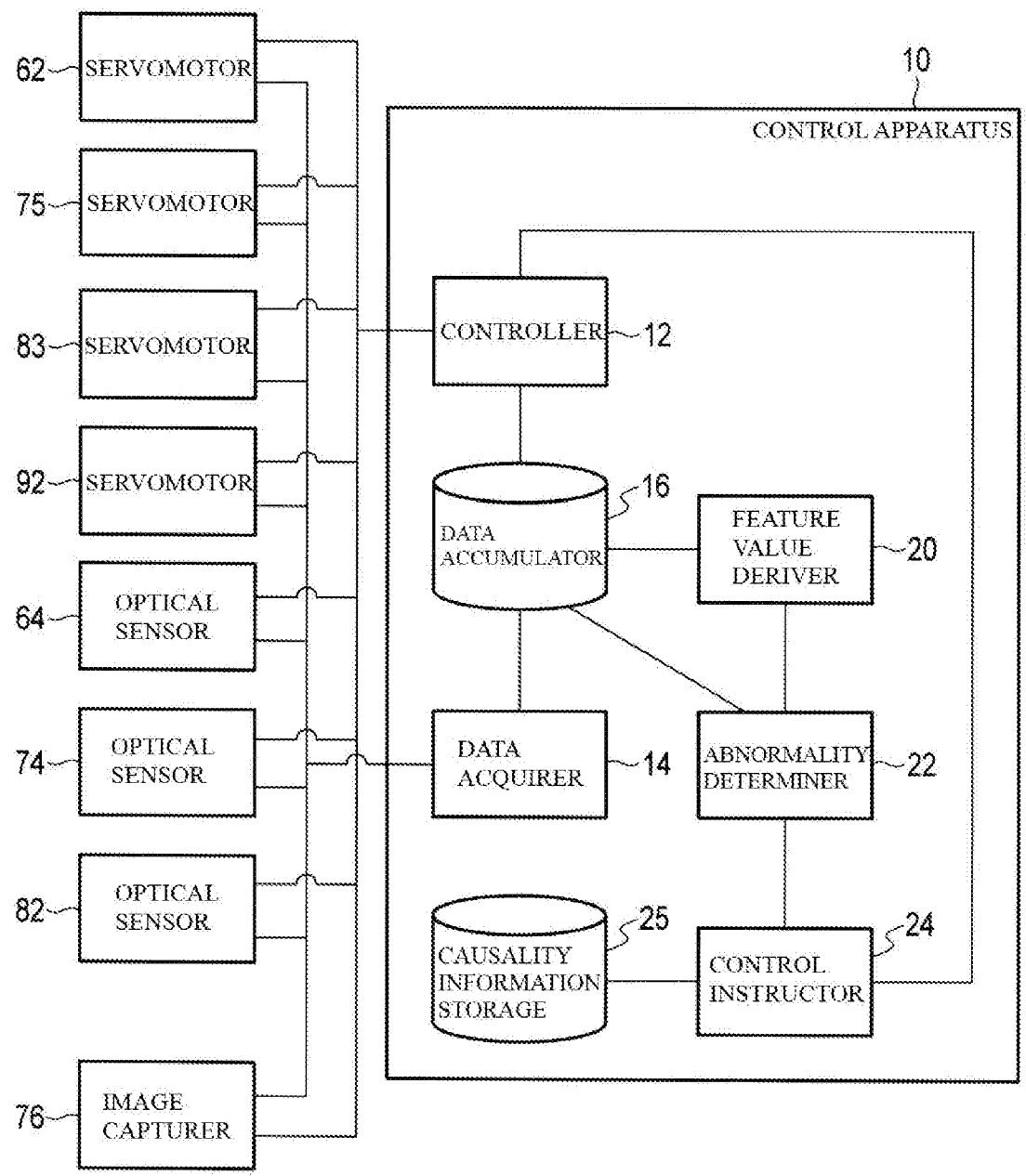
FIG. 1 is a functional block diagram illustrating a configuration example of an industrial control apparatus to which a control method according to one or more embodiments is applied.

FIG. 1 is a functional block diagram showing a configuration example of an industrial control apparatus 10 to which a control method according to one or more embodiments is applied.

The industrial control apparatus (hereinafter referred to simply as control apparatus) 10 according to one or more embodiments is an apparatus for controlling a production apparatus (including a manufacturing apparatus) that performs processing for sequentially producing items to be produced through a plurality of units that are arranged in a line from the upstream side toward the downstream side, as in a packaging machine, a laminating apparatus, or an assembly apparatus, for example. The control apparatus 10 has a CPU (Central Processing Unit) and a program memory that constitute a computer, and includes, as portions for performing control required to realize one or more embodiments, a controller 12, a data acquirer 14, a feature value deriver 20, an abnormality determiner 22, and a control instructor 24, which will be described later. All of these portions are realized by causing the CPU to execute programs stored in the program memory.

The control apparatus 10 also includes a data accumulator 16 and a causality information storage 25. The data accumulator 16 and the causality information storage 25 are nonvolatile memories or storage mediums in/from which data can be written and read at any time, such as SSDs (Solid State Drives) or HDDs (Hard Disk Drives).

The following description will take, as an example, a case where this control apparatus 10 is applied to a horizontal pillow packaging machine, which is an example of a production apparatus or manufacturing apparatus. However, the control apparatus 10 is not applied only to a horizontal pillow packaging machine. As mentioned above, the control apparatus 10 is also applicable to any apparatus other than a horizontal pillow packaging machine, as long as the apparatus is a production apparatus or a manufacturing apparatus for sequentially performing production processing on items to be produced through a plurality of units that are arranged in a line from the upstream side toward the downstream side. Note that, in this specification, an item to be packaged by the horizontal pillow packaging machine 40 is referred to as a workpiece, and an item to be produced refers to a combination of a workpiece that is the item to be packaged, and a film that is a packaging material for packaging the item to be packaged.

Figure 2:
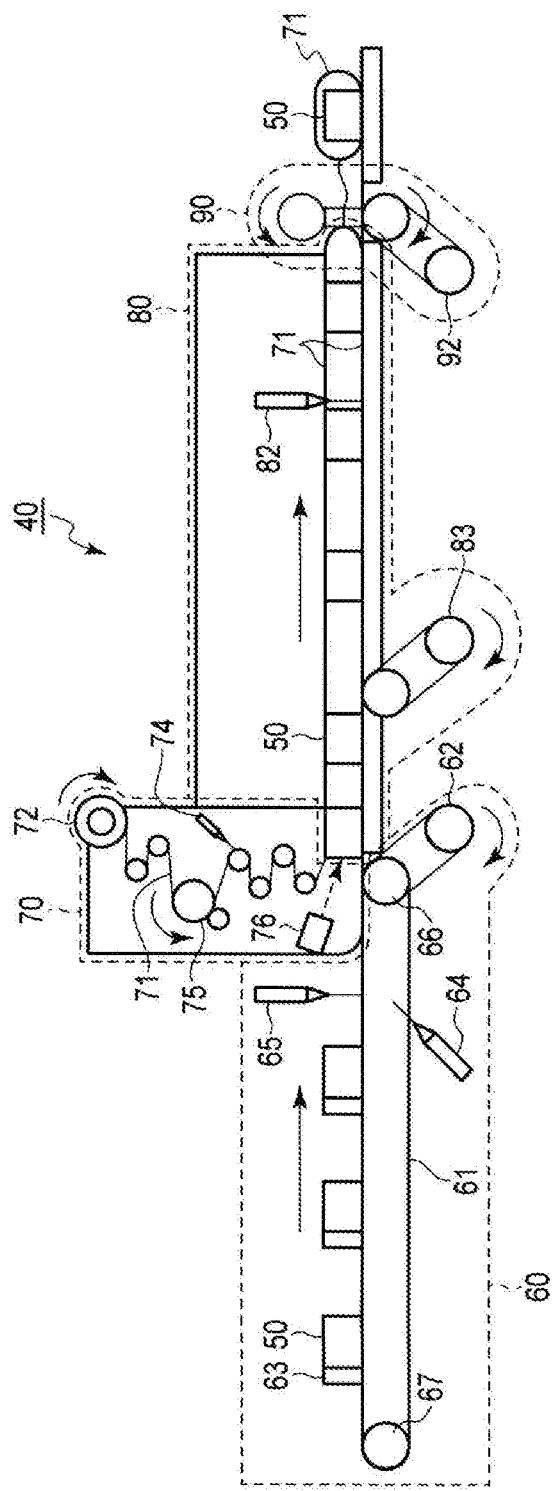
FIG. 2 is a schematic diagram illustrating a configuration example of a typical horizontal pillow packaging machine.

FIG. 2 is a schematic view showing a configuration example of a typical horizontal pillow packaging machine.

A horizontal pillow packaging machine 40 shown as an example in FIG. 2 is constituted by a workpiece conveyance mechanism 60, a film conveyance mechanism (main) 70, a film conveyance mechanism (sub) 80, and a top sealing mechanism 90.

The workpiece conveyance mechanism 60 is provided with sprockets 66 and 67 that are arranged in the front and rear, an endless chain 61 that is wound around the sprockets 66 and 67, and a servomotor 62 that provides a driving force for rotating the front sprocket 66.

Furthermore, a plurality of transferring fingers 63, which are positioning protrusions for placing workpieces 50 at even intervals on the endless chain 61, are provided on a surface of the endless chain 61 at even intervals in a longitudinal direction thereof.

The front sprocket 66 rotates as a result of being driven by the servomotor 62, and the transferring fingers 63 move from the upstream side (left side in the diagram) toward the downstream side (right side in the diagram) as a result of the endless chain 61 rotating.

Upon the transferring fingers 63 thus abutting against rear faces of the workpieces 50 that have been conveyed from an upstream apparatus (not shown) to the workpiece conveyance mechanism 60, the workpieces 50 also move forward due to the movement of the transferring fingers 63.

Note that, in this specification, items to be packaged by the horizontal pillow packaging machine 40 are referred to as workpieces 50.

The workpiece conveyance mechanism 60 is also provided with an optical sensor 64 for detecting the workpieces 50 conveyed by the endless chain 61.

The workpiece conveyance mechanism 60 is further provided with a workpiece ride-over sensor 65. A workpiece 50 that has ridden over foreign matter (not shown) is detected by the workpiece ride-over sensor 65.

In the film conveyance mechanism (main) 70, a roll 72, around which a film 71 is wound, is rotated by a servomotor 75, and thus, the film 71 is supplied toward the film conveyance mechanism (sub) 80 side.

Register marks, which are used as marks for sealing (hereinafter referred to simply as "top sealing") the film 71 in a direction perpendicular to the travelling direction of the film 71 and cutting of the film 71 in the top sealing mechanism 90, are given at even intervals on the surface of the film 71. As a result of the register marks being detected every predetermined period by an optical sensor 74 for detecting the register marks, it is confirmed that the film 71 has been supplied to the film conveyance mechanism (sub) 80 at a predetermined speed.

In the film conveyance mechanism (sub) 80, the film 71 that has been supplied from the film conveyance mechanism (main) 70 is formed into a tubular shape on the upstream side (left side) in the film conveyance mechanism (sub) 80. Next, a workpiece 50 is conveyed into this tube of the film 71 by the workpiece conveyance mechanism 60. An image of the state of the workpiece 50 when conveyed to the film conveyance mechanism (sub) 80 is captured by an image capturer 76, which is, for example, a camera.

The workpiece 50 that has been conveyed to the film conveyance mechanism (sub) 80 in a state of being arranged in the tube of the film 71 is conveyed together with the film 71 toward the top sealing mechanism 90 side. The state where each workpiece 50 is arranged in a tube of the film 71 is checked by an optical sensor 82, which is a sensor for detecting a workpiece shift.

The film 71 made into a tube in which the workpiece 50 is arranged is simultaneously subjected to top sealing and cutting by the top sealing mechanism 90, which is driven by a servomotor 92. Thus, the workpiece 50 in a state of being individually packaged in the film 71 is discharged from the horizontal pillow packaging machine 40.

In the control apparatus 10 according to one or more embodiments, when controlling this horizontal pillow packaging machine 40, the controller 12 regularly outputs a servo latch signal in every period T to the servomotors 62, 75, 83, and 92 and the data accumulator 16. The servomotors 62, 75, 83, and 92 are driven in accordance with intervals of the servo latch signal. The data accumulator 16 stores information regarding the time at which the servo latch signal is output.

As a result of the servomotors 62, 75, 83, and 92 being thus driven by the servo latch signal, the horizontal pillow packaging machine 40 is started, and a workpiece 50 and the film 71 are conveyed toward downstream units.

In response thereto, in the film conveyance mechanism (main) 70, register marks, which are provided at even intervals on a surface of the film 71, are detected by the optical sensor 74, and detection result data is output to the data acquirer 14. The torque of the servomotor 75 is also output to the data acquirer 14.

In the workpiece conveyance mechanism 60, a conveyed workpiece 50 is detected by the optical sensor 64, and detection result data is output to the data acquirer 14.

An image of the workpiece 50 in a state of being conveyed to the film conveyance mechanism (sub) 80 is captured by the image capturer 76, and the result of capturing this image is output as the detection result to the data acquirer 14.

In the film conveyance mechanism (sub) 80, workpieces 50 that are successively being conveyed are detected by the optical sensor 82, and detection result data is output to the data acquirer 14.

Furthermore, the torque of the servomotor 92 in the top sealing mechanism 90 is also output to the data acquirer 14.

The data acquirer 14 thus acquires, in each cycle, the detection result data, which is constituted by physical quantities that indicate states, from the optical sensors 64, 74, and 82, the servomotors 75 and 92, and the image capturer 76, in units that are subjected to monitoring, for each cycle. "Cycle" refers to a unit of processing time for processing performed in each of a plurality of units. The physical quantities are not limited to analog quantities, and may also be, for example, logical values that consist of binary signals, such as those of fiber sensor output. The data acquirer 14 outputs the aforementioned detection result data to the data accumulator 16 and causes the data accumulator 16 to store it.

The data accumulator 16 stores the detection result data output from the data acquirer 14.

Figure 3:
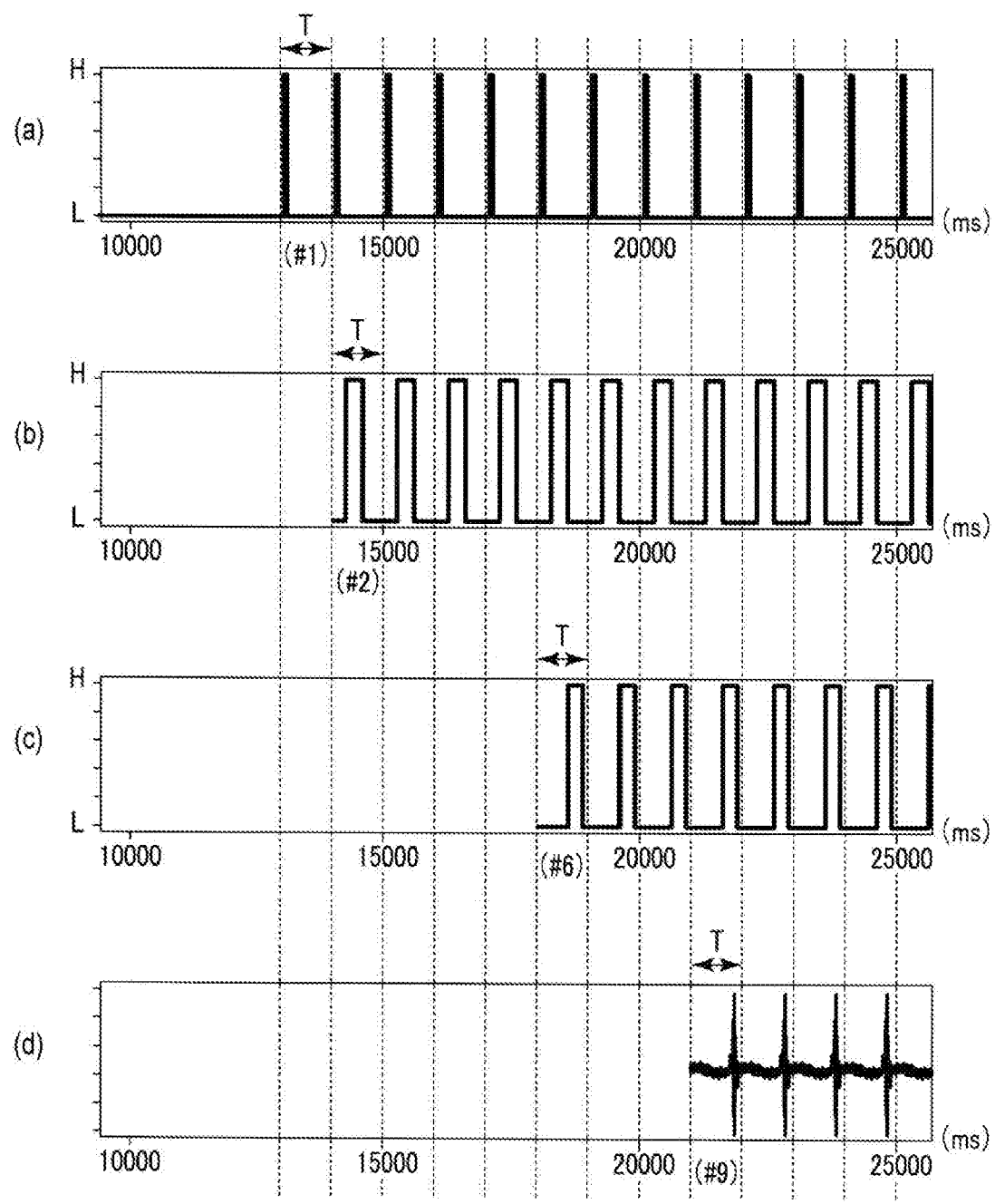
FIG. 3 is a diagram illustrating an example of a temporal relationship between detection results acquired after a horizontal pillow packaging machine is started.

FIG. 3 shows an example of a temporal relationship between detection results acquired after the horizontal pillow packaging machine 40 is started. FIG. 3 shows diagrams in which some parts of the detection result data stored in the data accumulator 16 are indicated with the same time axis that is based on a cycle unit of the period T, for example, and the unit of the horizontal axis is ms (millisecond).

That is to say, upon control of the horizontal pillow packaging machine 40 being started in a cycle #1 of the film conveyance mechanism (main) 70, the servo latch signal is output from the controller 12 to the servomotor 75. The servomotor 75 is driven in accordance therewith, and, as a result of the film 71 being conveyed from the film conveyance mechanism (main) 70 to the film conveyance mechanism (sub) 80, the register marks are detected by the optical sensor 74.

Pulses shown in (a) of FIG. 3 correspond to the detection signal output from the optical sensor 74.

Thereafter, the servo latch signal is regularly output in every period T from the controller 12, for subsequent processing, and accordingly, the detection signal is also regularly output in every period T from the optical sensor 74.

In the workpiece conveyance mechanism 60, a workpiece 50, which is to be arranged between a register mark that is detected by the optical sensor 74 in a cycle #1 of the film conveyance mechanism (main) 70 and a register mark that is detected by the optical sensor 74 in a cycle 21 of the film conveyance mechanism (main) 70, is detected in the cycle #2 by the optical sensor 64.

Pulses shown in (b) of FIG. 3 correspond to the detection signal output from the optical sensor 64. If the horizontal pillow packaging machine 40 is normally operating continuously, thereafter, this detection signal is also output regularly in every period T.

A workpiece 50 that is detected in a cycle #2 of the workpiece conveyance mechanism 60 is detected by the optical sensor 82 in a cycle #6 of the film conveyance mechanism (sub) 80, in a state of being arranged in a tube of the film 71 between a register mark detected in the cycle #1 of the film conveyance mechanism (main) 70 and a register mark detected in the cycle #2 of the film conveyance mechanism (main) 70.

Pulses shown in (c) of FIG. 3 correspond to the detection signal output from the optical sensor 82. If the horizontal pillow packaging machine 40 is normally operating continuously, thereafter, this detection signal is also output regularly in every period T.

The workpiece 50 detected in the cycle #6 of the film conveyance mechanism (sub) 80 is conveyed to the top sealing mechanism 90, and is subjected to top sealing and cutting in a cycle #9 of the top sealing mechanism 90.

A waveform shown in (d) of FIG. 3 corresponds to a waveform signal of the torque of the servomotor 92 in the top sealing mechanism 90. A steep peak of the waveform indicates a state where torque is applied to the servomotor 92. If the horizontal pillow packaging machine 40 is normally operating continuously, thereafter, this steep peak also regularly occurs in every period T.

Note that the data that is acquired in every cycle by the data acquirer 14 and accumulated in the data accumulator 16 is not limited to the aforementioned data. For example, by additionally providing various sensors such as a camera, thermometer, and manometer along the units in the horizontal pillow packaging machine 40, acquiring, using the data acquirer 14, physical quantity data, which is the detection results, in each cycle from these sensors, and outputting the acquired physical quantity data from the data acquirer 14 to the data accumulator 16, the data accumulator 16 can store various types of data in addition to the aforementioned data.

There may also cases where, even if the objects to be detected by these sensors are workpieces 50 and the film 71 when in the respective units, the mechanisms 60, 70, 80, and 90 themselves in the horizontal pillow packaging machine 40 are also detected thereby. For example, the detection result shown in (a) of FIG. 3 is associated with the film 71, and the detection results shown in (b) and (c) of FIG. 3 are associated with workpieces 50. Meanwhile, the detection result shown in (d) of FIG. 3 is associated with the torque of the servomotor 92, and is, therefore, a detection result associated with the top sealing mechanism 90 itself.

Accordingly, if, as mentioned above, various sensors such as a camera, thermometer, and manometer are additionally provided along the units in the horizontal pillow packaging machine 40, objects to be detected by these sensors may be workpieces 50 and the film 71, and may also be the mechanisms 60, 70, 80, and 90 themselves in the horizontal pillow packaging machine 40. Detection to be performed in the respective units is determined as appropriate based on the determination made in later-described abnormality determination processing.

The feature value deriver 20 performs analysis based on the detection result data stored in the data accumulator 16, derives a feature value, which is a value of a predetermined feature, and outputs the derived feature value to the abnormality determiner 22. The feature value is, for example, (1) elapsed time from a rise of the servo latch signal until a rise of the detection signal from the optical sensor 82, (2) a difference between an image captured by the image capturer 76 and a reference image, or (3) a torque value of the servomotor 75. For example, regarding (2), the reference image data is image data of a workpiece 50 that is captured in a state where no foreign matter is present, and is stored in advance in the data accumulator 16. In the case of obtaining a difference between the image captured by the image capturer 76 and the reference image, the feature value deriver 20 acquires the reference image data from the data accumulator 16.

Figure 4:
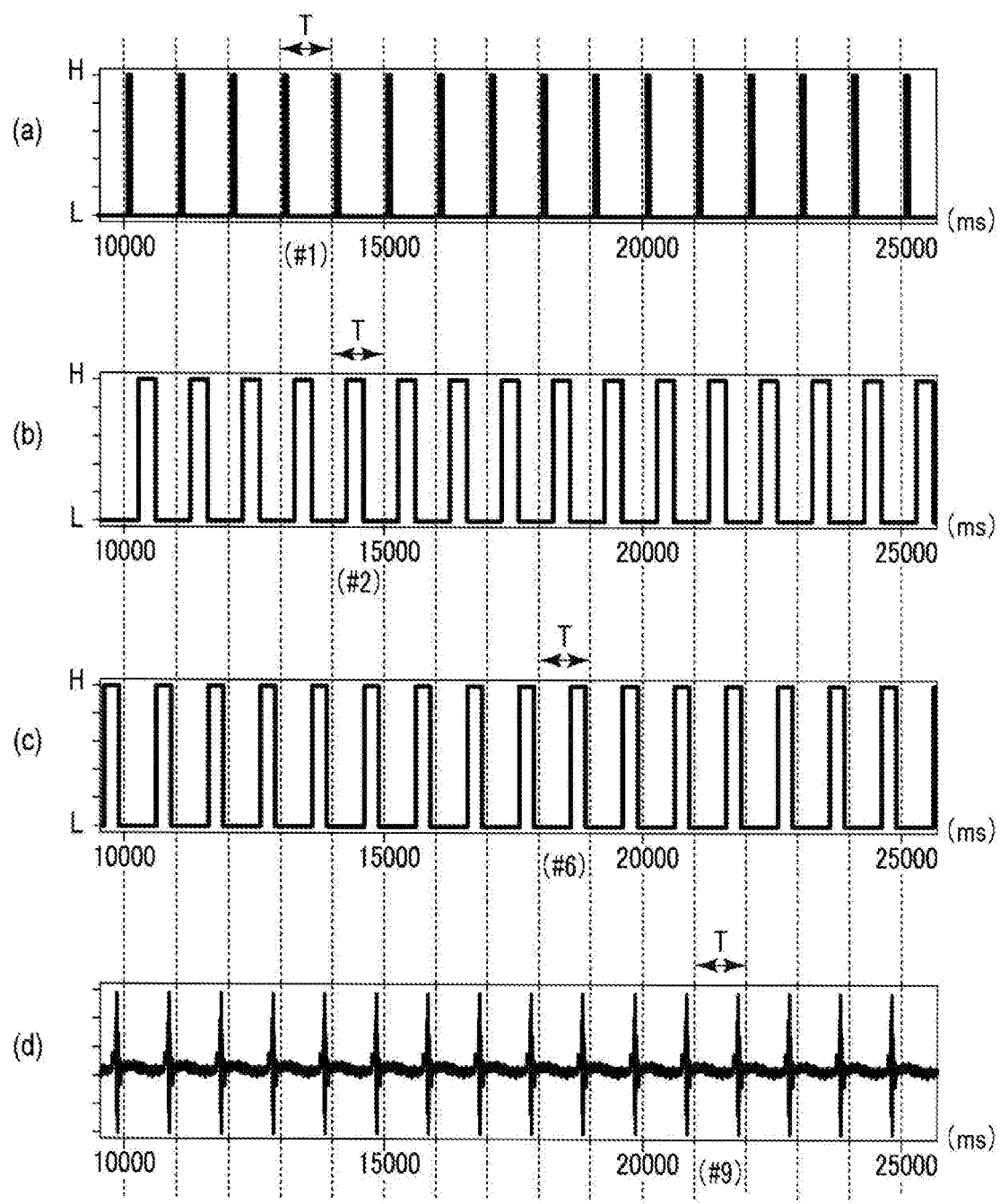
FIG. 4 is a diagram illustrating an example of a temporal relationship between detection results acquired in a state where a horizontal pillow packaging machine is normally working continuously.

FIG. 4 shows an example of a temporal relationship between detection results acquired in a state where the horizontal pillow packaging machine 40 is normally working continuously.

The abnormality determiner 22 determines the unit and cycle in which an abnormality has occurred, and the type of abnormality, by using the feature value output from the feature value deriver 20. A specific determination procedure will now be described in association with the aforementioned feature values (1) to (3).

(1) Case where the Feature Value is the Elapsed Time from a Rise of the Servo Latch Signal Until a Rise of the Detection Signal from the Optical Sensor 82

Figure 5:
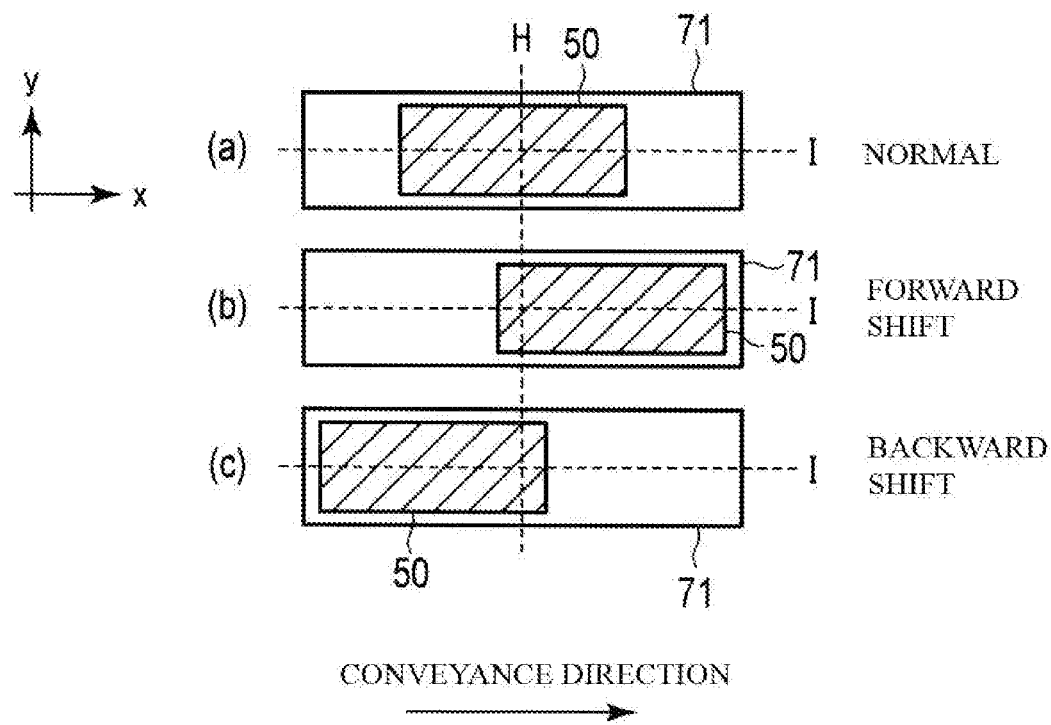
FIG. 5 is a diagram illustrating top views illustrating a typical example of positional relationships between a workpiece and a film.
Figure 6:
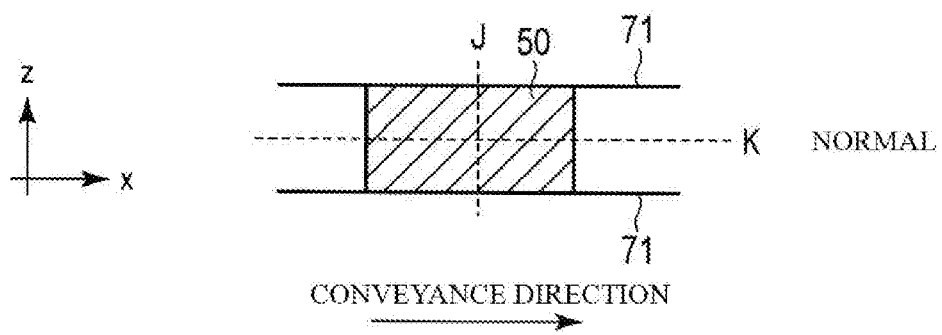
FIG. 6 is a side view illustrating a typical example of a positional relationship between a workpiece and a film.

In both FIGS. 5 and 6, the direction from the left side toward the right side in the diagrams is the direction in which workpieces 50 are conveyed, and the rightward direction in the diagrams corresponds to the direction toward the top sealing mechanism 90 side (i.e. downstream units).

FIG. 5 shows top views illustrating an example of typical positional relationships between a workpiece 50 and the film 71. The x axis in FIG. 5 corresponds to the direction in which the workpiece 50 is conveyed and the longitudinal direction of the film 71, and the y axis corresponds to the width direction of the film 71.

FIG. 6 is a side view illustrating an example of a typical positional relationship between a workpiece 50 and the film 71. The x axis in FIG. 6 corresponds to the direction in which the workpiece 50 is conveyed and the longitudinal direction of the film 71, and the z axis corresponds to the height direction of the workpiece 50.

If the horizontal pillow packaging machine 40 is properly operating continuously, the positional relationship between the workpiece 50 and the film 71 when detected by the optical sensor 82 is as shown in (a) of FIG. 5 and FIG. 6.

In FIG. 5, the broken line I is a line that passes through the center of the film 71 in the width direction. Accordingly, the broken line I is parallel to the longitudinal direction of the film 71. The broken line H corresponds to the position at which the optical sensor 82 is arranged in the longitudinal direction of the film 71. The intersection point between the broken line H and the broken line I corresponds to a target position for a light beam emitted by the optical sensor 82.

In FIG. 6, the broken line J corresponds to the vertically downward direction from the position at which the optical sensor 82 is arranged, and the broken line K is a horizontal line that passes through at a position that is at half the height of the workpiece 50.

A state where the broken line I passes through the center in the width direction of the workpiece 50, and where the intersection point between the broken line H and the broken line I coincides with the planar center point of the workpiece 50 when seen from above, as shown in (a) of FIG. 5 and FIG. 6, will be hereinafter referred to as a "normal state".

Figure 7:
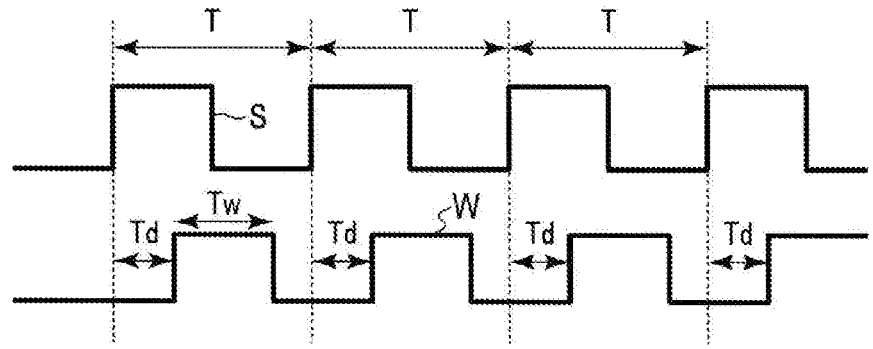
FIG. 7 is a schematic diagram illustrating a temporal relationship between a servo latch signal and a detection signal from an optical sensor in a state, such as in (a) of FIG. 5.

FIG. 7 is a schematic diagram showing a temporal relationship between the servo latch signal and the detection signal from the optical sensor in the normal state. FIG. 7 also schematically expresses a temporal relationship between (a) and (c) of FIG. 4. As shown in FIG. 7, in the normal state, normal-state elapsed time Td, which is the elapsed time from a rise of a servo latch signal S until a rise of a detection signal W from the optical sensor 82, is fixed in all cycles.

Figure 8:
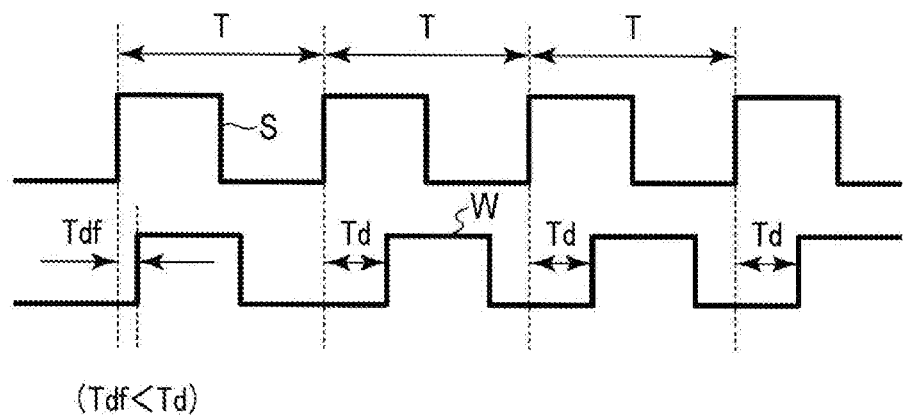
FIG. 8 is a schematic diagram showing a temporal relationship between a servo latch signal and a detection signal from an optical sensor in a state, such as in (b) of FIG. 5.

FIG. 8 is a schematic diagram showing a temporal relationship between the servo latch signal and the detection signal from the optical sensor in a state where a workpiece 50 is shifted forward (i.e. toward the downstream side; this shift will be hereinafter referred to as "forward shift") during the first cycle, as shown in (b) of FIG. 5. As shown in FIG. 8, in the first cycle in which a forward shift is occurring, forward-shift elapsed time Tdf, which is the elapsed time from a rise of the servo latch signal S until a rise of the detection signal W from the optical sensor 82, is shorter than the normal-state elapsed time Td.

Figure 9:
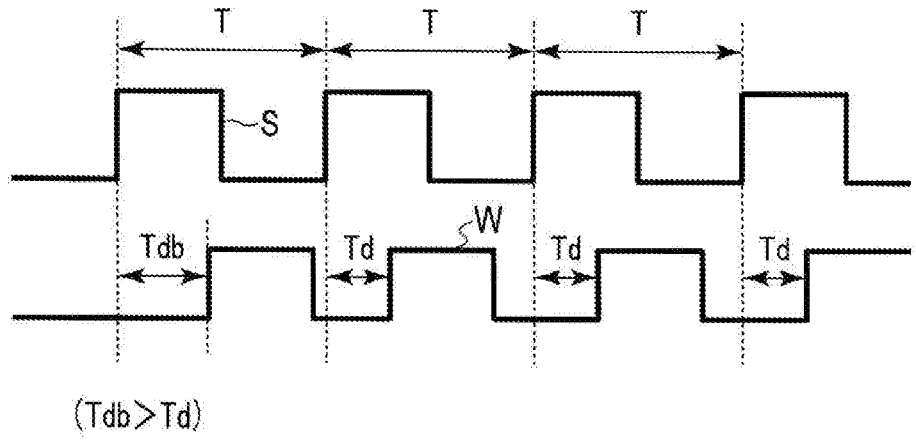
FIG. 9 is a schematic diagram showing a temporal relationship between a servo latch signal and a detection signal from an optical sensor in a state, such as in (c) of FIG. 5.

FIG. 9 is a schematic diagram showing a temporal relationship between the servo latch signal and the detection signal from the optical sensor in a state where a workpiece 50 is shifted backward (i.e. toward the upstream side; this shift will be hereinafter referred to as "backward shift") during the first cycle, as shown in (c) of FIG. 5. As shown in FIG. 9, in the first cycle in which a backward shift is occurring, backward-shift elapsed time Tdb, which is the elapsed time from a rise of the servo latch signal S until a rise of the detection signal W from the optical sensor 82, is longer than the normal-state elapsed time Td.

The abnormality determiner 22 compares the elapsed time output from the feature value deriver 20 with a time difference threshold th1_forward, which is predetermined for a forward shift and is stored in the abnormality determiner 22. If the elapsed time is shorter than the time difference threshold th1_forward, it is determined that the workpiece 50 is shifted forward.

If it is not determined that the workpiece 50 is shifted forward, the abnormality determiner 22 compares the elapsed time with a time difference threshold th1_back, which is predetermined for a backward shift and is stored in the abnormality determiner 22. If the elapsed time is longer than the time difference threshold th1_back, it is determined that the workpiece 50 is shifted backward.

If it is determined that the workpiece 50 is shifted forward or backward, the abnormality determiner 22 determines that a workpiece position shift has occurred in the film conveyance mechanism (sub) 80, and outputs, to the control instructor 24, a determination result that includes the location where the abnormality was detected (film conveyance mechanism (sub) 80), the abnormality content (workpiece position shift), and the timing at which the abnormality occurred.

(2) Case where the Feature Value is the Difference Between the Image Captured by the Image Capturer 76 and the Reference Image When there is no foreign matter (present), all images of workpieces 50 captured by the image capturer 76 are substantially the same, and if these images are compared through image analysis with the reference image that is obtained by capturing an image of a workpiece 50 with no foreign matter present, the difference therebetween is small. However, an image of a workpiece 50 that is captured by the image capturer 76 when foreign matter is present is different from the reference image, and a significant difference is found through image analysis.

Accordingly, if the difference between the image that is captured by the image capturer 76 and output from the feature value deriver 20 and the reference image is greater than a predetermined threshold, the abnormality determiner 22 determines that "existence of foreign matter" has occurred in the workpiece conveyance mechanism 60, and outputs, to the control instructor 24, a determination result that includes the location where the abnormality was detected (workpiece conveyance mechanism 60), the abnormality content (existence of foreign matter), and the timing at which the abnormality occurred.

(3) Case where the Feature Value is the Torque of the Servomotor 75

If the servomotor 75 is operating normally, the torque value of the servomotor 75 is substantially fixed. However, if the film 71 has slipped, the torque value of the servomotor 75 significantly differs from a value obtained during normal operation. Originally, the film 71 comes into contact with a rotation shaft of the servomotor 75, and is conveyed due to the friction therebetween as a result of the rotation shaft operating. A slip refers to a state where the film 71 is conveyed substantially irrespective of the movement of the rotation shaft, i.e. in a state where substantially no friction is generated.

Accordingly, if the torque value of the servomotor 75 significantly differs from the torque value obtained during normal operation, e.g. greatly differs from the torque value of the servomotor 75 during normal operation by more than a predetermined threshold, the abnormality determiner 22 determines that the film 71 has slipped and "film slip failure" has occurred in the film conveyance mechanism (main) 70, and outputs, to the control instructor 24, a determination result that includes the location where the abnormality was detected (film conveyance mechanism (main) 70), the abnormality content (film slip failure), and the timing at which the abnormality occurred.

Note that the above description has taken an example in which the feature value deriver 20 performs analysis based on the physical quantities stored in the data accumulator 16 and derives a feature value, and the abnormality determiner 22 determines whether or not an abnormality has occurred, based on the feature value. However, the abnormality determiner 22 may also directly use the physical quantity data stored in the data accumulator 16 to determine whether or not an abnormality has occurred, rather than make a determination based on the feature value.

The control instructor 24 determines a malfunction that will occur due to a factor that is the abnormality content included in the determination result output from the abnormality determiner 22. For this determination, the control instructor 24 uses causality information that is stored in the causality information storage 25. Alternatively, a configuration may also be employed in which the causality information storage 25 is omitted, and the control instructor 24 stores the causality information in a memory built into the control instructor 24.

Figure 10:
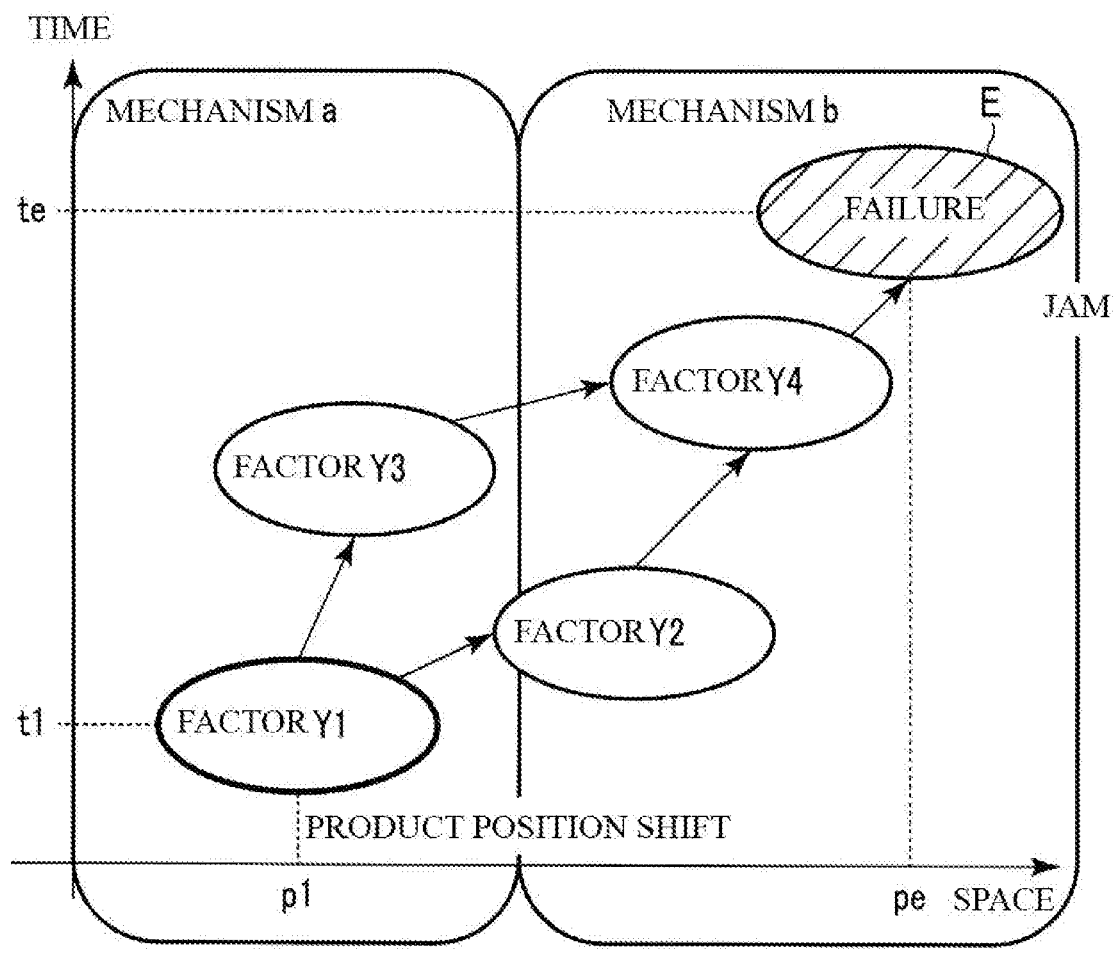
FIG. 10 is a diagram illustrating a construction model of general causality information.

FIG. 10 is a diagram illustrating a construction model of general causality information.

In FIG. 10, the horizontal axis indicates space, and the vertical axis indicates time. Accordingly, units that are located further on the left side in the diagram correspond to those that are further on the upstream side, and units that are further on the right side correspond to those that are further on the downstream side. For simplification, FIG. 10 shows a model for an apparatus that is constituted by two mechanisms, which are an upstream mechanism a and a downstream mechanism b.

A factor Y1 is an abnormality (e.g. product position shift) that was detected at time t1 in a space p1 in the mechanism a. Arrows that extend from the factor Y1 to a factor Y2 and a factor Y3 indicate that, due to the factor Y1, an abnormality that is the factor Y2 will occur in the mechanism b, and an abnormality that is the factor Y3 will occur in the mechanism a. Accordingly, the factor Y4 indicates an abnormality that occurs in the mechanism b due to the factor Y2 and the factor Y3. It is then indicated that, ultimately, a malfunction E (e.g. jam) occurs at time to in a space pe in the mechanism b due to the factor Y4. The causality information thus indicates the causality between factors (abnormality content) and a malfunction that occurs with a time delay due to the factors.

Figure 11:
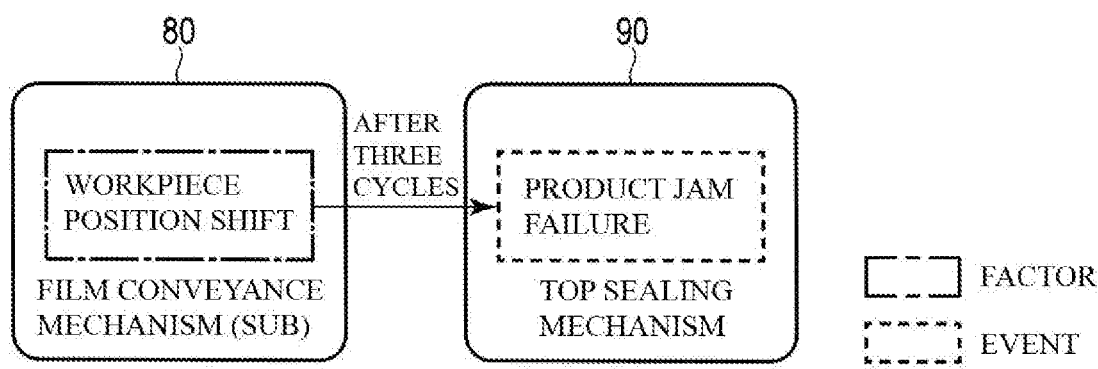
FIG. 11 is a diagram illustrating an example of causality information created for a horizontal pillow packaging machine.
Figure 12:
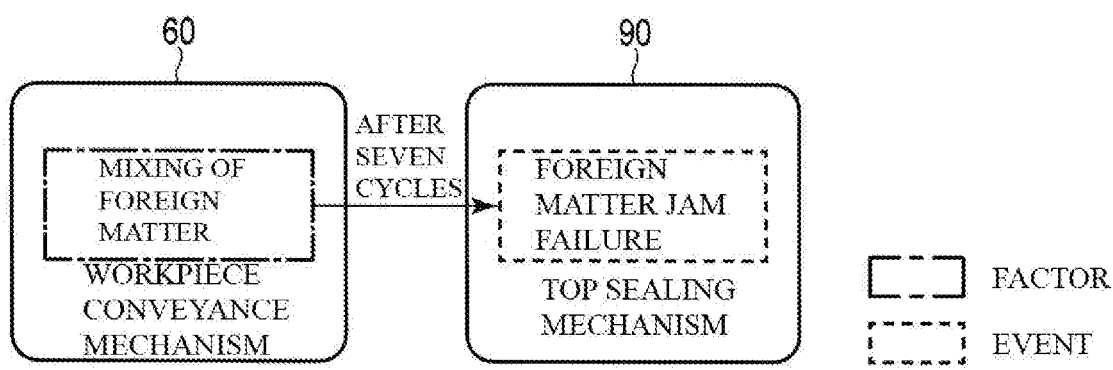
FIG. 12 is a diagram illustrating another example of causality information created for a horizontal pillow packaging machine.
Figure 13:
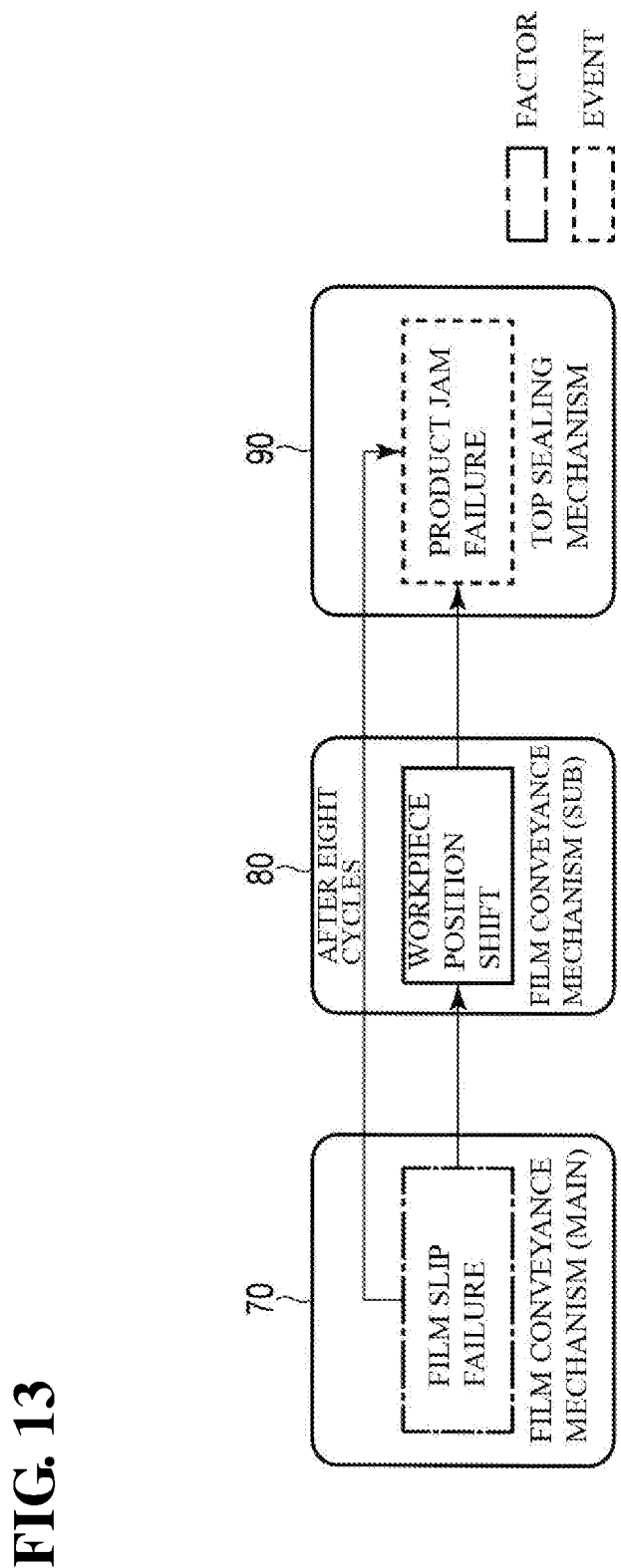
FIG. 13 is a diagram illustrating yet another example of causality information created for a horizontal pillow packaging machine.

The causality information storage 25 stores the causality information, such as that shown in FIGS. 11 to 13, that is created for the horizontal pillow packaging machine 40.

FIG. 11 indicates that a workpiece 50 that has been affected by a factor "workpiece position shift" in the film conveyance mechanism (sub) 80 that is an upstream unit will cause a malfunction that is an event "product jam failure" in the top sealing mechanism 90 that is a downstream unit, during processing performed by the top sealing mechanism 90 third cycles after the timing at which the position shift occurred.

FIG. 12 indicates that a workpiece 50 that has been affected by a factor (existence of foreign matter) in the workpiece conveyance mechanism 60 that is an upstream unit will cause a malfunction that is an event "foreign matter jam failure" in the top sealing mechanism 90 that is a downstream unit, during processing performed by the top sealing mechanism 90 seven cycles after the timing at which the foreign matter was mixed.

FIG. 13 indicates that the film 71 that has been affected by a factor "film slip failure" in the film conveyance mechanism (main) 70 that is an upstream unit will thereafter cause "workpiece position shift" in the film conveyance mechanism (sub) 80, and then, a malfunction that is an event "product jam failure" will be caused in the top sealing mechanism 90 by the "workpiece position shift" serving as a factor, during processing performed by the top sealing mechanism 90 eight cycles after the timing at which the "film slip failure", which is the aforementioned first factor, occurred.

The control instructor 24 determines the unit in which an abnormality occurred, the number of cycles after which a malfunction will occur after the timing at which the abnormality occurred, and the type of malfunction that is to occur, using the abnormality content included in the determination result output from the abnormality determiner 22, based on the causality information such as that shown in FIGS. 11 to 13. The control instructor 24 also generates control information for giving an instruction to perform abnormality handling processing as processing in the unit for which it is determined that a malfunction will occur, in the determined cycle, and outputs the generated control information to the controller 12. For example, the abnormality handling processing is processing in which processing that is performed at the normal time is not performed (i.e. processing for passing a workpiece while not performing any processing thereon).

For example, a table is stored in the causality information storage 25, the table storing the cycle-specific information for specifying a cycle in which the top sealing mechanism 90 is to perform the abnormality handling processing on a workpiece that has been affected by an abnormality, in association with each of a plurality of upstream units that are subjected to abnormality monitoring. The cycle-specific information is set as the number of cycles in which, or the number of times that, processing is performed on workpieces that precede the workpiece that has been affected by an abnormality, during a period from the timing at which the aforementioned abnormality occurred until when the affected workpiece arrives at, and is processed by, the top sealing mechanism 90, for example.

The control instructor 24 recognizes the unit in which the abnormality occurred, based on the abnormality content that is included in the determination result output from the abnormality determiner 22, and reads out the cycle-specific information that corresponds to the recognized unit, from the aforementioned table. Then, the control instructor 24 instructs the top sealing mechanism 90 to perform the abnormality handling processing on the workpiece as processing in a cycle after the number of cycles (or number of times) that is designated in the cycle-specific information.

Thus, even if there are a plurality of units that are subjected to monitoring, the top sealing mechanism 90 can be caused to perform the abnormality handling processing at an appropriate timing (cycle), regardless of the unit in which an abnormality occurs.

Since the cycle in which the top sealing mechanism 90 is caused to perform the abnormality handling processing is designated using the number of cycles in which, or the number of times that, the top sealing mechanism 90 itself performs processing, the top sealing mechanism 90 can always be made to execute the abnormality handling processing in an appropriate cycle, even in a case where the cycle time of respective upstream units that are subjected to monitoring, i.e. the time taken from the respective units until the top sealing mechanism 90 is reached is not even.

Note that the aforementioned specific information does not necessarily need to be stored in a memory table. For example, based on the determination result output from the abnormality determiner 22, the control instructor 24 may also count, using a counter, the number of cycles that are performed by the top sealing mechanism 90 during a period from the time point at which it is determined that an abnormality has occurred until a workpiece that has been affected thereby arrives at the top sealing mechanism 90, and perform control so that the abnormality handling processing is performed as processing in a cycle that corresponds to a preset count value.

Examples of the abnormality handling processing that correspond to a plurality of specific factors in the occurrence of an abnormality will be described below.

The controller 12 outputs the control information output from the control instructor 24 to a corresponding unit in the horizontal pillow packaging machine 40. Thus, the unit to which the control information is output performs the abnormality handling processing in accordance with the control information. Thus, the control apparatus 10 can avoid a malfunction. A specific avoidance procedure will now be described, taking (1) to (3) below as examples. Note that these are associated with (1) to (3) described above.

(1) In a case where the abnormality determiner 22 outputs, to the control instructor 24, a determination result that includes the location where the abnormality was detected (film conveyance mechanism (sub) 80), the abnormality content (workpiece position shift), and the timing at which the abnormality occurred (e.g. timing corresponding to the cycle #6), the control instructor 24 determines, based on the causality information shown in FIG. 11, that a malfunction that is "product jam failure" will occur in the top sealing mechanism 90 due to the factor "workpiece position shift" in the film conveyance mechanism (sub) (80). Furthermore, the control instructor 24 generates control information for instructing the top sealing mechanism 90 to perform the abnormality handling processing in a cycle (i.e. cycle #9) after three cycles executed by the top sealing mechanism 90 from the abnormality occurrence timing, and outputs the generated control information to the controller 12.

(2) In a case where the abnormality determiner 22 outputs, to the control instructor 24, a determination result that includes the location where the abnormality was detected (workpiece conveyance mechanism 60), the abnormality content (existence of foreign matter), and the timing at which the abnormality occurred (e.g. timing corresponding to the cycle #2), the control instructor 24 determines, based on the causality information shown in FIG. 12, that a malfunction that is "foreign matter jam failure" will occur in the top sealing mechanism 90 due to the factor "existence of foreign matter" in the workpiece conveyance mechanism 60. Furthermore, the control instructor 24 generates control information for giving an instruction to perform the abnormality handling processing in a cycle (i.e. cycle #9) after seven cycles executed by the top sealing mechanism 90 from the timing at which the abnormality occurred, and outputs the generated control information to the controller 12.

(3) In a case where the abnormality determiner 22 outputs, to the control instructor 24, a determination result that includes the location where the abnormality was detected (film conveyance mechanism (main) 70), the abnormality content (film slip failure), and the timing at which the abnormality occurred (e.g. timing corresponding to the cycle #1), the control instructor 24 determines, based on the causality information shown in FIG. 13, that "workpiece position shift" will occur in the film conveyance mechanism (sub) 80 due to the factor "film slip failure" in the film conveyance mechanism (main) 70, and ultimately, a malfunction that is "product jam failure" will occur in the top sealing mechanism 90 with this "workpiece position shift" in the film conveyance mechanism (sub) (80) serving as a factor. Furthermore, the control instructor 24 generates control information for giving an instruction to perform the abnormality handling processing in a cycle (i.e. cycle #9) after eight cycles executed by the top sealing mechanism 90 from the timing at which the abnormality occurred, and outputs the generated control information to the controller 12.

The controller 12 outputs the control information output from the control instructor 24 to a unit for which the abnormality handling processing is to be performed. In all of the above examples (1) to (3), the control information is output to the top sealing mechanism 90.

Figure 14:
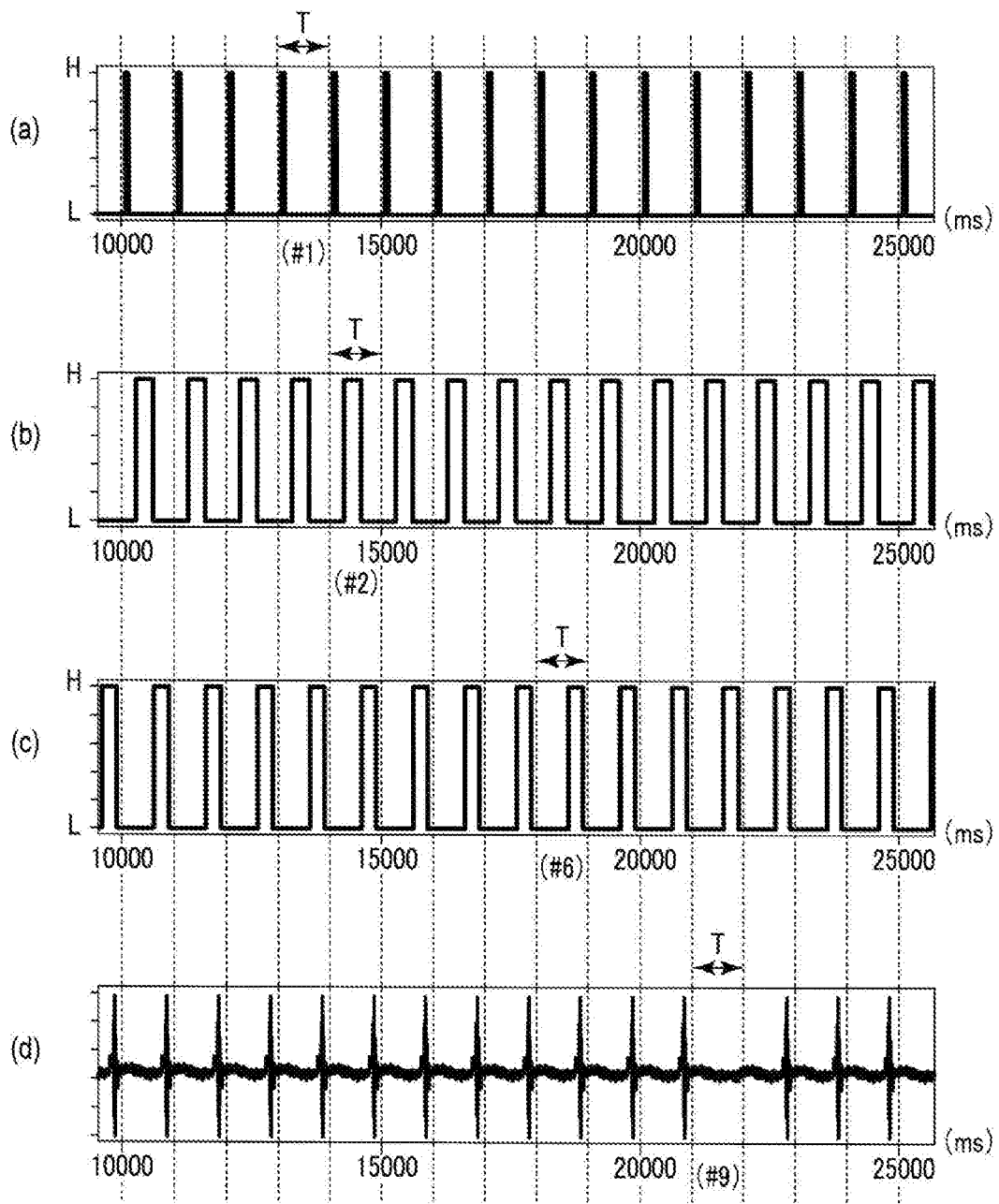
FIG. 14 is a diagram illustrating an example of a temporal relationship between detection signals in a case where abnormality handling processing is performed.

As a result, the top sealing mechanism 90 performs the abnormality handling processing only in a cycle (e.g. cycle #9) after the number of cycles designated in the control information from the cycle that corresponds to the timing at which an abnormality occurred in an upstream unit has passed. That is to say, the top sealing mechanism 90 performs top sealing and cutting as performed during normal operation, until the cycle #8 that is executed thereby. However, in the cycle #9, the top sealing mechanism 90 does not perform top sealing and cutting. Thereafter, the top sealing mechanism 90 performs top sealing and cutting as performed during normal operation, in the cycle #10 onward. In accordance therewith, in (d) of FIG. 14, steep peaks are observed until the cycle #8, but no steep peak is observed in the cycle #9, and steep peaks are again observed in the cycle #10 onward.

Thus, in a unit for which it is determined that a malfunction will occur, the abnormality handling processing is selectively performed during a cycle in which a workpiece 50 that has been affected by an abnormality is processed, thereby avoiding a malfunction.

Note that, in all of the above examples (1) to (3), the control information is output to the top sealing mechanism 90. However, this is merely an example, and the control information may also be output to another mechanism and the abnormality handling processing is performed in that mechanism.

Next, a description will be given of operations performed when the horizontal pillow packaging machine 40 is controlled by the control apparatus 10 according to one or more embodiments that is configured as described above.

Figure 15:
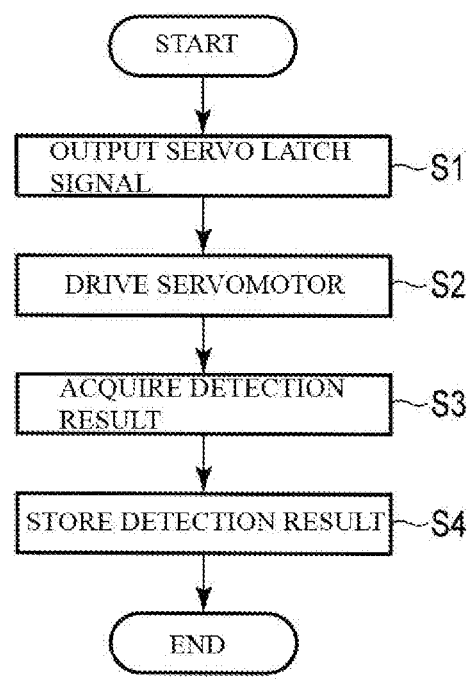
FIG. 15 is a flowchart illustrating an operation example during data acquisition.

First, an operation example during data acquisition will be described using the flowchart shown in FIG. 15.

To start the horizontal pillow packaging machine 40, the servo latch signal is output in every fixed period T from the controller 12 to the servomotors 62, 75, 83, and 92 and the data accumulator 16 (S1). The servomotors 62, 75, 83, and 92 are driven in accordance with intervals of the servo latch signal. The data accumulator 16 stores information regarding the time at which the servo latch signal is output.

As a result of the servomotors 62, 75, 83, and 92 being thus driven by the servo latch signal, the horizontal pillow packaging machine 40 is started, and a workpiece 50 and the film 71 are conveyed toward a unit on the downstream side (S2).

In response thereto, in the film conveyance mechanism (main) 70, the register marks in the film 71 are detected by the optical sensor 74. The torque of the servomotor 75 is also detected. In the workpiece conveyance mechanism 60, the workpiece 50 is detected by the optical sensor 64. Furthermore, an image of the state where the workpiece 50 is conveyed to the film conveyance mechanism (sub) 80 is captured by the image capturer 76. In the film conveyance mechanism (sub) 80, the workpiece 50 is detected by the optical sensor 82. The aforementioned detection result data is constantly output to the data acquirer 14 (S3).

Note that the data acquired by the data acquirer 14 is not limited to the aforementioned data. For example, detection result data from various sensors such as a camera, a thermometer, and a manometer that are additionally provided along the units in the horizontal pillow packaging machine 40 may also be acquired.

The aforementioned detection result data is further output to the data accumulator 16 by the data acquirer 14, and is stored in the data accumulator 16 (S4).

Figure 16:
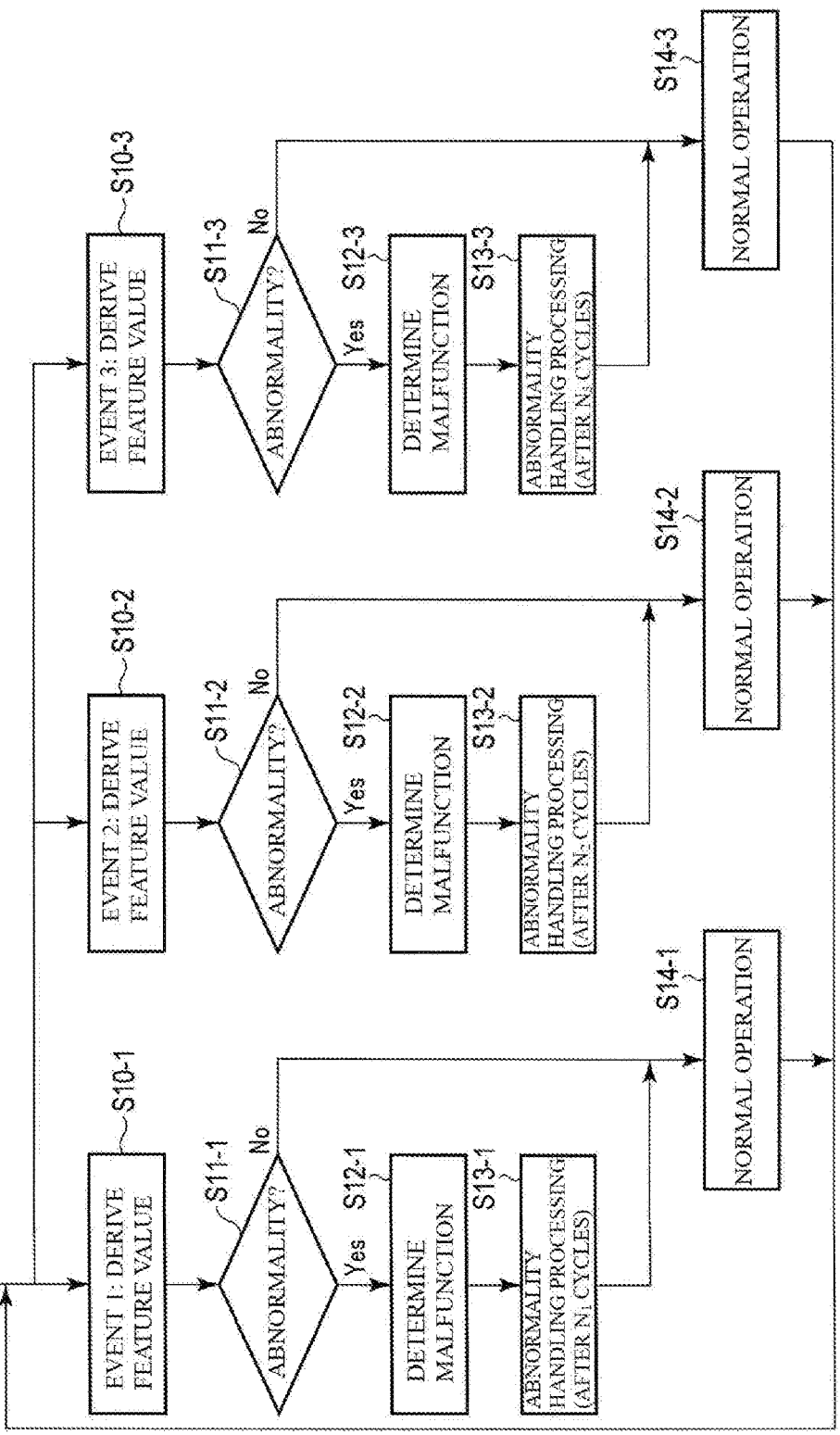
FIG. 16 is a flowchart illustrating an operation example during abnormality determination.

Next, an example of operations performed for determining an abnormality will be described using the flowchart shown in FIG. 16.

In the feature value deriver 20, analysis is performed based on the detection result data stored in the data accumulator 16, the feature value is derived, and the derived feature value is output to the abnormality determiner 22 (S10). The feature value is, for example, (1) elapsed time from a rise of the servo latch signal until a rise of the detection signal from the optical sensor 82, (2) a difference between the image captured by the image capturer 76 and the reference image, (3) the torque value of the servomotor 75, or the like, but is not limited thereto.

The abnormality determiner 22 determines the unit in which an abnormality has occurred, and the type of abnormality that occurred, by using the feature value output from the feature value deriver 20 (S11). The determination result that includes the location where the abnormality was detected, the abnormality content, and the timing at which the abnormality occurred is output to the control instructor 24. Specific operations performed during this determination will now be described, while taking events associated with the aforementioned feature values (1) to (3) as examples.

(1) In a case where elapsed time from a rise of the servo latch signal S until a rise of the detection signal W from the optical sensor 82 is output as the feature value from the feature value deriver 20 (S10-1), the abnormality determiner 22 determines, based on this elapsed time, whether or not "workpiece position shift" has occurred in the film conveyance mechanism (sub) 80 (S11-1). If it is determined that "workpiece position shift" has occurred (S11-1: Yes), a determination result that includes the location where the abnormality was detected (film conveyance mechanism (sub) 80, the abnormality content (workpiece position shift), and the timing at which the abnormality occurred (e.g. timing that corresponds to the cycle #6) is output to the control instructor 24. On the other hand, if it is not determined that "workpiece position shift" has occurred (S11-1: No), no such determination result is output to the control instructor 24, and normal operations are continued (S14-1).

(2) In a case where a difference between an image captured by the image capturer 76 and a reference image is output as the feature value from the feature value deriver 20 (S10-2), the abnormality determiner 22 determines that "existence of foreign matter" has occurred in the workpiece conveyance mechanism 60 if the difference is greater than a predetermined threshold (S11-2: Yes), and a determination result that includes the location where the abnormality was detected (workpiece conveyance mechanism 60), the abnormality content (existence of foreign matter), and the timing at which the abnormality occurred (e.g. timing that corresponds to the cycle #2) is output to the control instructor 24. On the other hand, if it is not determined that "existence of foreign matter" has occurred (S11-2: No), no such determination result is output to the control instructor 24, and normal operations are continued (S14-2).

(3) In a case where a torque value of the servomotor 75 is output as the feature value from the feature value deriver 20 (S10-3), the abnormality determiner 22 determines that the film 71 has slipped and "film slip failure" has occurred in the film conveyance mechanism (main) 70 (S11-3: Yes) if it is determined that the torque value of the servomotor 75 significantly differs from the torque value during normal operation, e.g. if it greatly differs from the torque value of the servomotor 75 during normal operation by more than a preset threshold, and a determination result that includes the location where the abnormality was detected (film conveyance mechanism (main) 70), the abnormality content (film slip failure), and the timing at which the abnormality occurred (e.g. timing that corresponds to the cycle #1) is output to the control instructor 24. On the other hand, if it is not determined that "film slip failure" has occurred (S11-3: No), no such determination result is output to the control instructor 24, and normal operations are continued (S14-3).

The control instructor 24 determines the unit in which the abnormality occurred, the number of cycles from the timing at which the abnormality occurred until a malfunction will occur, and the type of malfunction that will occur, using the abnormality content included in the determination results output from the abnormality determiner 22, based on the causality information such as that shown in FIGS. 11 to 13 (S12). The control instructor 24 also generates control information for giving an instruction to perform the abnormality handling processing as processing in the unit for which it is determined that a malfunction will occur, in the determined cycle, and outputs the generated control information to the controller 12. For example, the abnormality handling processing refers to not performing processing that is normally performed. Specific operations performed during this determination will now be described for respective events associated with the aforementioned feature values (1) to (3).

(1) In a case where, in step S11-1, the determination result that includes the location where the abnormality was detected (film conveyance mechanism (sub) 80), the abnormality content (workpiece position shift), and the timing at which the abnormality occurred (e.g. timing that corresponds to the cycle #6) is output from the abnormality determiner 22 to the control instructor 24 (S11-1: Yes), the control instructor 24 determines, based on the causality information shown in FIG. 11, that a malfunction that is "product jam failure" will occur after N1 cycles (three cycles in this example) executed in the top sealing mechanism 90, due to the factor "workpiece position shift" in the film conveyance mechanism (sub) 80. Accordingly, the control information for instructing the top sealing mechanism 90 to perform the abnormality handling processing after N1 cycles (three cycles in this example) from when the abnormality occurred in the film conveyance mechanism (sub) 80 is generated and is output to the controller 12 (S12-1).

(2) In a case where, in step S11-2, the determination result that includes the location where the abnormality was detected (workpiece conveyance mechanism 60), the abnormality content (existence of foreign matter), and the timing at which the abnormality occurred (e.g. timing that corresponds to the cycle #2) is output from the abnormality determiner 22 to the control instructor 24 (S11-2: Yes), the control instructor 24 determines, based on causality information such as that shown in FIG. 12, that a malfunction that is "foreign matter jam failure" will occur after N2 cycles (seven cycles in this example) executed by the top sealing mechanism 90, due to the factor "existence of foreign matter" in the workpiece conveyance mechanism 60. Accordingly, the control information for instructing the top sealing mechanism 90 to perform the abnormality handling processing after N2 cycles (seven cycles in this example) from when the abnormality occurred in the workpiece conveyance mechanism 60 is generated, and is output to the controller 12 (S12-2).

(3) In a case where, in step S11-3, the determination result that includes the location where the abnormality was detected (film conveyance mechanism (main) 70), the abnormality content (film slip failure), and the timing at which the abnormality occurred (e.g. timing that corresponds to the cycle #1) is output from the abnormality determiner 22 to the control instructor 24 (S11-3: Yes), the control instructor 24 determines, based on the causality information shown in FIG. 13, that "workpiece position shift" will occur in the film conveyance mechanism (sub) 80 due to the factor "film slip failure" in the film conveyance mechanism (main) 70, and ultimately, a malfunction that is "product jam failure" will occur in the top sealing mechanism 90 after N3 cycles (eight cycles in this example) executed by the top sealing mechanism 90, with "workpiece position shift" in the film conveyance mechanism (sub) 80 serving as a factor. Accordingly, the control information for instructing the top sealing mechanism 90 to perform the abnormality handling processing during a cycle after N3 cycles (eight cycles in this example) from when the abnormality occurred in the film conveyance mechanism (main) 70 is generated, and is output to the controller 12 (S12-3).

The control information output from the control instructor 24 to the controller 12 in the steps S12-1, S12-2, and S12-3 is output from the controller 12 to units that are to perform the abnormality handling processing (S13-1, S13-2, S13-3).

In step S13-1, the control information is output from the controller 12 to the top sealing mechanism 90. Thus, the top sealing mechanism 90 is controlled so as not to perform top sealing and cutting in a cycle (e.g. cycle #9) after three cycles executed thereby. Note that, in cycles after four cycles, top sealing and cutting are performed as in processing at the normal time (S14-1).

In step S13-2, the control information is output from the controller 12 to the top sealing mechanism 90. Thus, the top sealing mechanism 90 is controlled so as not to perform top sealing and cutting in a cycle (e.g. cycle #9) after seven cycles executed thereby. Note that, in cycles after eight cycles, top sealing and cutting are performed as they are in normal processing (S14-2).

In step S13-3, the control information is output from the controller 12 to the top sealing mechanism 90. Thus, the top sealing mechanism 90 is controlled so as not to perform top sealing and cutting in a cycle (e.g. cycle #9) after eight cycles executed thereby. Note that, in cycles after nine cycles, top sealing and cutting are performed as they are in normal processing (S14-3).

Note that, in cases where it is not determined in steps S11-1, S11-2, and S11-3 that an abnormality has occurred (S11-1: No, S11-2: No, S11-3: No), the abnormality handling processing is not performed as in steps S13-1, S13-2, and S13-3, and accordingly, normal operations are continued (S14-1, S14-2, S14-3).

As described above, with the control apparatus 10 to which the control method according to one or more embodiments is applied, if an abnormality has occurred in a unit that is subjected to monitoring, the abnormality handling processing is performed in units that are located downstream of that unit, only on a workpiece 50 that has been affected by this abnormality, and normal processing is performed on the other workpieces, simply by managing the number of cycles, without performing precise time management. Accordingly, even if an abnormality has occurred in a unit that is subjected to monitoring, operations can be continued without stopping processing of the entire production apparatus or manufacturing apparatus, and thus, high availability of the apparatus can be maintained.

OTHER APPLICATION EXAMPLES

The above one or more embodiments have described, as an example, the case where the control apparatus 10 to which the control method according to one or more embodiments is applied is applied to the horizontal pillow packaging machine 40. The following description will briefly describe some examples in which the control apparatus 10 is applied to other production apparatuses or manufacturing apparatuses.

Another Application Example 1: Vertical Pillow Packaging Machine

Figure 17:
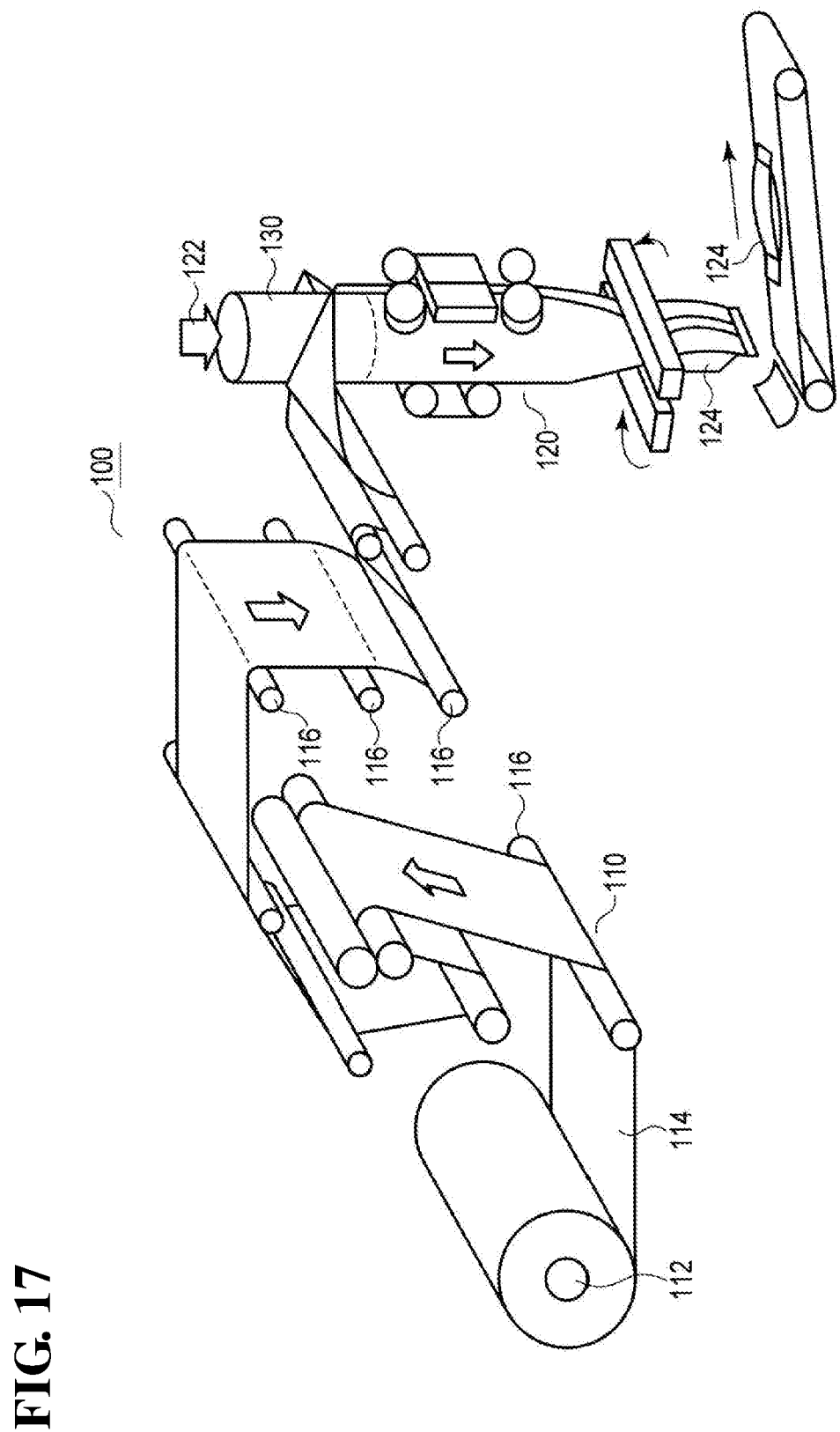
FIG. 17 is a schematic view illustrating a configuration example of a typical vertical pillow packaging machine.

FIG. 17 is a schematic view showing a configuration example of a typical vertical pillow packaging machine 100.

The vertical pillow packaging machine 100 shown in FIG. 17 is constituted by a film conveyance mechanism (main) 110 for conveying a film 114, which is wound around a paper tube 112, via a large number of conveyance shafts 116 by rotating the paper tube 112 around which the film 114 is wound around, using a servo (not shown), a film conveyance mechanism (sub) 120 for folding the film 114 that has been conveyed by the film conveyance mechanism (main) 110 into a tubular shape and forming bags 124 that are to be filled with content 122, a filling mechanism 130 for filling the bags 124 with the content 122, and a top sealing mechanism 140 for cutting and sealing the bags 124 that are filled with the content 122 and separating the bags 124 as individual packaged items 142.

Figure 18:
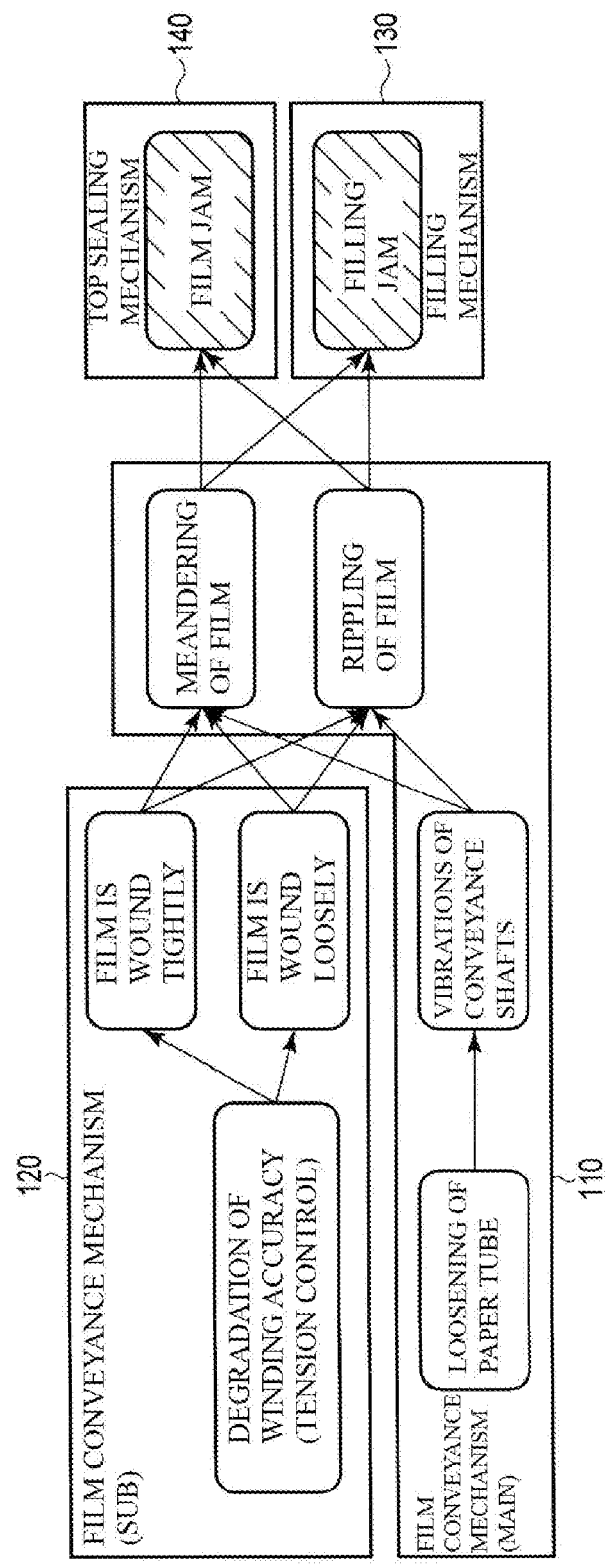
FIG. 18 is a diagram illustrating an example of causality information in a vertical pillow packaging machine.

FIG. 18 shows an example of causality information regarding the vertical pillow packaging machine 100 that has the above-described configuration.

It is indicated that, due to factors such as degradation of winding accuracy of the film 114 in the film conveyance mechanism (sub) 120 and loosening of the paper tube 112 in the film conveyance mechanism (main) 110, ultimately, malfunctions such as a film jam in the top sealing mechanism 140 and a filling jam in the filling mechanism 130 will occur.

A description will be given below of an example of detection of vibrations of the conveyance shafts 116 in a case where the conveyance shafts 116 vibrate, and avoidance of a malfunction.

As shown in FIG. 1, in the control apparatus 10, the data acquirer 14 acquires data regarding the torque value of the servo in the film conveyance mechanism (main) 110, and causes the data accumulator 16 to store the data.

If the torque value of the servo in the film conveyance mechanism (main) 110 stored in the data accumulator 16 significantly differs from the torque value during normal operation, the abnormality determiner 22 determines that the conveyance shafts 116 are vibrating, and outputs, to the control instructor 24, a determination result that includes the location where the abnormality was detected (film conveyance mechanism (main) 110), the abnormality content (vibrations of the conveyance shafts 116), and the time of occurrence.

The control instructor 24 determines, based on the causality information shown in FIG. 18, that malfunctions such as a filling jam in the filling mechanism 130 and a film jam in the top sealing mechanism 140 will occur, with the abnormality content (vibrations of the conveyance shaft 116) serving as a factor. Then, to avoid the determined malfunctions, control information A for controlling the filling mechanism 130 so as not to perform filling using the filling is generated.

The control information A also includes non-operating cycle information, which defines the number of cycles of the filling mechanism 130 after which control will be performed so as not to fill the filling. For example, by providing a mark on the film 114 at each length that corresponds to a cycle, the number of cycles of the filling mechanism 130 after which the film 114 conveyed from the film conveyance mechanism (main) 110, which is the abnormality was the abnormality was detected, will be subjected to filling processing can be found. Accordingly, the control instructor 24 determines the non-operating cycle information that designates a cycle (e.g. cycle after NA cycles) during which the filling operation will not be performed by the filling mechanism 130, and adds the determined non-operating cycle information to the control information A. The control instructor 24 outputs this control information A to the controller 12.

Alternatively, in place of the non-operating cycle information, time information (e.g. for aa seconds after AA seconds) regarding the time during which the filling operation will not be performed by the filling mechanism 130 may also be included in the control information A. In the case of the vertical pillow packaging machine 100, the number of seconds after which the film 114 that has been conveyed from the film conveyance mechanism (main) 110, which is the location where the abnormality was detected, is subjected to filling processing in the filling mechanism 130 is known. Accordingly, the control instructor 24 determines the aforementioned time information and adds the determined time information to the control information A. The control instructor 24 outputs this control information A to the controller 12.

The controller 12 outputs the control information A to the filling mechanism 130. As a result, the filling mechanism 130 does not fill the filling during the cycle after NA cycles in accordance with the non-operating cycle information. Otherwise, the filling mechanism 130 does not perform filling using the filling for aa seconds after AA seconds in accordance with the time information.

By thus using a time difference from when the factor that is the vibrations of the conveyance shafts 116 is detected in the film conveyance mechanism (main) 110 until when the film 114 that has been adversely affected by this factor is processed in the filling mechanism 130, the control information A for the abnormality handling processing is output to the filling mechanism 130 during a period that corresponds to the time difference. As a result, only the adversely affected film 114 will not be filled with the filling, and therefore, malfunctions can be avoided without stopping the vertical pillow packaging machine 100. As a result, high availability of the vertical pillow packaging machine 100 can be maintained.

Next, an example of detection of tight or loose winding of the film 114 in a case where the film 114 is wound tightly or loosely, and avoidance of a malfunction will be described as another example.

As shown in FIG. 1, in the control apparatus 10, the data acquirer 14 acquires data regarding the torque value of the servo in the film conveyance mechanism (sub) 120, and causes the data accumulator 16 to store the data.

If the torque value of the servo in the film conveyance mechanism (sub) 120 stored in the data accumulator 16 significantly differs from the value during normal operation, the abnormality determiner 22 determines that the film 114 is wound tightly or loosely, and outputs, to the control instructor 24, a determination result that includes the location where the abnormality was detected (film conveyance mechanism (sub) 120), the abnormality content (the film 114 is wound tightly or loosely), and the time of occurrence.

The control instructor 24 determines, based on the causality information shown in FIG. 18, that malfunctions such as a filling jam in the filling mechanism 130 and a film jam in the top sealing mechanism 140 will occur, with the abnormality content (the film 114 is wound tightly or loosely) serving as a factor. Then, to avoid the determined malfunctions, control information B for controlling the filling mechanism 130 so as not to fill the filling is generated.

The control information B also includes non-operating cycle information, which defines the number of cycles of the filling mechanism 130 after which control will be performed so as not to fill the filling. For example, by providing a mark on the film 114 at each length that corresponds to a cycle, the number of cycles of the filling mechanism 130 after which the film 114 from the film conveyance mechanism (sub) 120, in which the abnormality was detected, will be subjected to filling processing can be found. Accordingly, the control instructor 24 determines the non-operating cycle information that designates a cycle (e.g. cycle after NB cycles) during which the filling operation is not performed by the filling mechanism 130, and adds the determined non-operating cycle information to the control information B. The control instructor 24 outputs this control information B to the controller 12.

Alternatively, in place of the non-operating cycle information, time information (e.g. for bb seconds after BB seconds) regarding the time during which the filling operation will not be performed of the filling mechanism 130 may also be included in the control information B. In the case of the vertical pillow packaging machine 100, the number of seconds after which the film 114 from the film conveyance mechanism (sub) 120, in which the abnormality was detected, is subjected to filling processing in the filling mechanism 130 is known. Accordingly, the control instructor 24 determines the aforementioned time information and adds the determined time information to the control information B. The control instructor 24 outputs this control information B to the controller 12.

The controller 12 outputs the control information B to the filling mechanism 130. As a result, the filling mechanism 130 does not perform filling using the filling during a cycle after NB cycles in accordance with the non-operating cycle information. Otherwise, the filling mechanism 130 does not fill the filling for bb seconds after BB seconds in accordance with the time information.

By thus using a time difference from when the factor that the film 114 is wound tightly or loosely is detected in the film conveyance mechanism (sub) 120 until when the film 114 that has been adversely affected by this factor is processed in the filling mechanism 130, the control information B for the abnormality handling processing is output to the filling mechanism 130 during a period that corresponds to the time difference. As a result, only the adversely affected film 114 will not be filled with the filling, and therefore, the malfunctions can be avoided without stopping the vertical pillow packaging machine 100. As a result, high availability of the vertical pillow packaging machine 100 can be maintained.

Another Application Example 2: Print Laminating Apparatus

Figure 19:
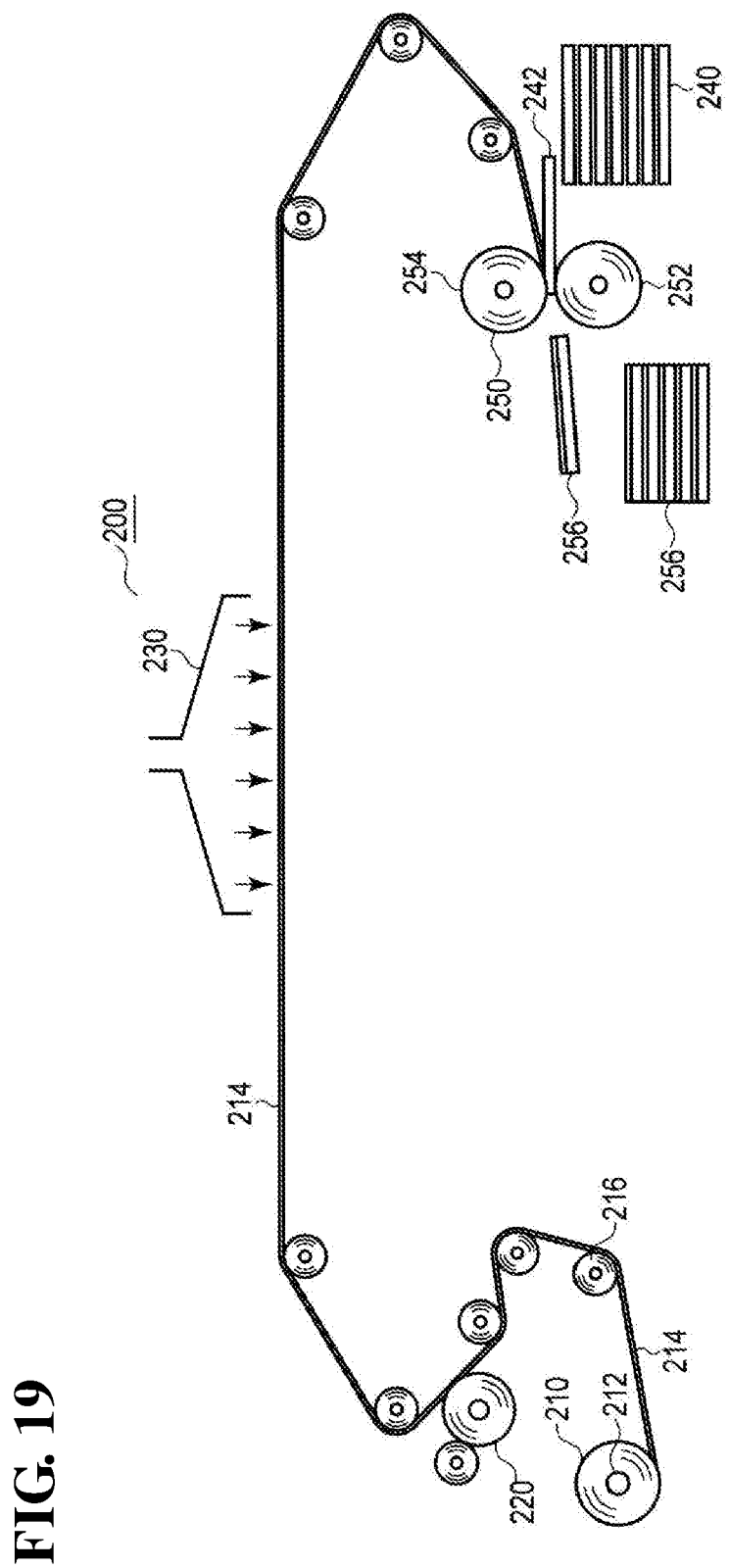
FIG. 19 is a schematic view illustrating a configuration example of a typical print laminating apparatus.

FIG. 19 is a schematic view showing a configuration example of a typical print laminating apparatus 200.

The print laminating apparatus 200 shown in FIG. 19 is constituted by a film conveyance mechanism (main) 210 for conveying a film 214, which is wound around a paper tube 212, via a large number of conveyance shafts 216 by rotating the paper tube 212 around which the film 214 is wound, using a servo (not shown), an application mechanism 220 for applying an adhesive to the film 214 that has been conveyed by the film conveyance mechanism 210, a drying mechanism 230 for drying the film 214 to which the adhesive has been applied, a print conveyance mechanism 240 for conveying a print 242 to be adhered to the film 214 that has been dried by the drying mechanism 230, to an adhesion mechanism 250, and the adhesion mechanism 250 for obtaining a finished product 256 by adhering the film 214 to the print 242 that has been conveyed by the print conveyance mechanism 240 by causing the print 242 and the film 214 to pass between an impression cylinder 252 and a heated roll 254, and thereafter cutting the adhered print 242 and film 214.

Figure 20:
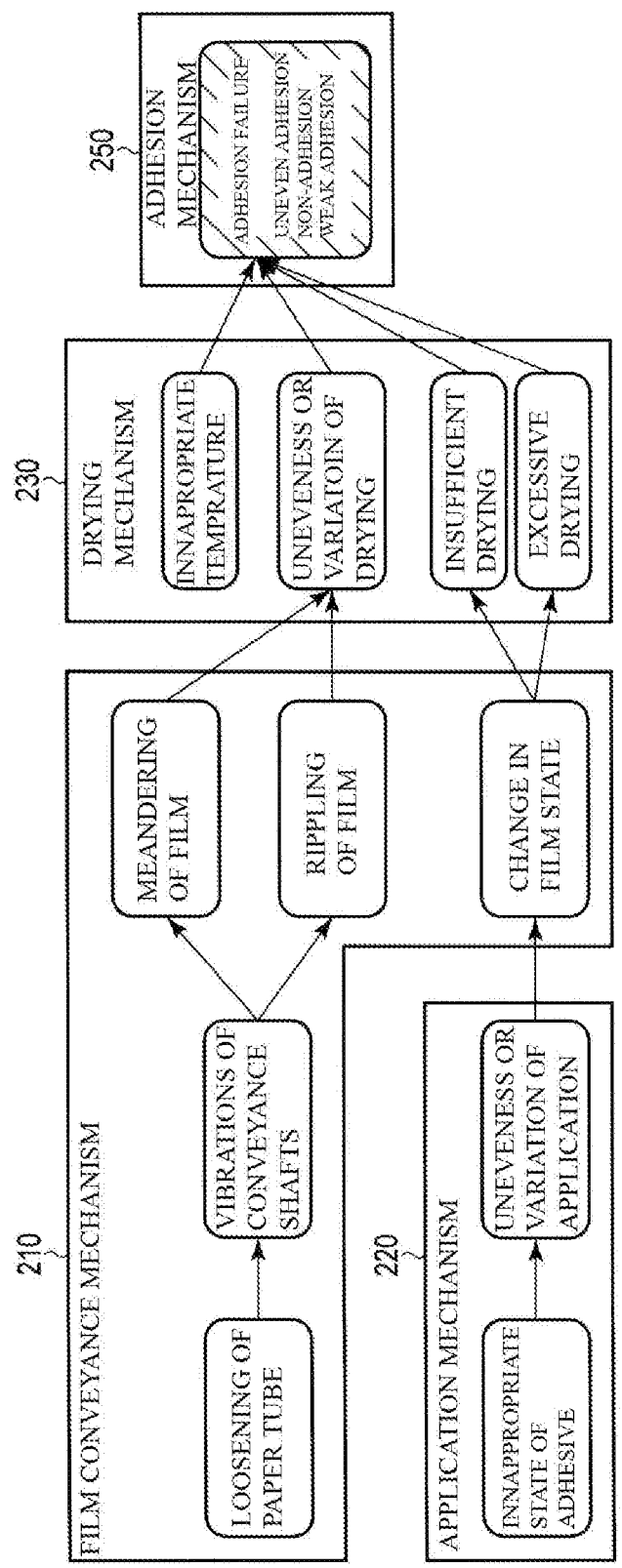
FIG. 20 is a diagram illustrating an example of causality information in a print laminating apparatus.

FIG. 20 shows an example of causality information in the print laminating apparatus 200 that has the above-described configuration.

It is indicated that the loosening of the paper tube 212 in the film conveyance mechanism 210 will cause vibrations of the conveyance shafts 216, which will then cause meandering of the film 214 or rippling of the film 214, and unevenness or variation of the drying in the drying mechanism 230, and this serves as a factor that will ultimately cause a malfunction that is adhesion failure (e.g. uneven adhesion, non-adhesion, weak adhesion) in the adhesion mechanism 250.

It is also indicated that an inappropriate state of the adhesive in the application mechanism 220 will lead to unevenness or variation of application, a change in the state of the film 214, and insufficient drying or excessive drying in the drying mechanism 230, and this serves as a factor that will ultimately cause a malfunction that is adhesion failure in the adhesion mechanism 250.

A description will be given below of an example of detection of a change in the state of the film in a case where the film state has changed in the film conveyance mechanism 210, and avoidance of a malfunction.

As shown in FIG. 1, in the control apparatus 10, the data acquirer 14 acquires data regarding the torque value of the servo in the film conveyance mechanism 210, and causes the data accumulator 16 to store the data.

If the torque value of the servo in the film conveyance mechanism 210 stored in the data accumulator 16 significantly differs from the torque value during normal operation, the abnormality determiner 22 determines that the state of the film 214 has changed, and outputs, to the control instructor 24, a determination result that includes the location at which the abnormality was detected (film conveyance mechanism 210), the abnormality content (change in the state of the film 214), and the time of occurrence.

The control instructor 24 determines, based on the causality information shown in FIG. 20, that a malfunction that is adhesion failure will occur in the adhesion mechanism 250, with the abnormality content (change in the state of the film 214) serving as a factor. Then, to avoid the determined malfunction, control information C for controlling the print conveyance mechanism 240 so as not to convey the print 242 is generated.

The control information C also includes non-operating cycle information, which defines the number of cycles of the print conveyance mechanism 240 after which control will be performed so that the print 242 will not be conveyed. For example, by providing a mark on the film 214 at each length that corresponds to a cycle, the number of cycles after which the print 242 will be conveyed in the print conveyance mechanism 240 for the film 214 conveyed by the film conveyance mechanism 210 in which the abnormality was detected, can be found. Accordingly, the control instructor 24 determines the non-operating cycle information that designates a cycle (e.g. cycle after $N_C$ cycles) during which the conveyance operation will not be performed by the print conveyance mechanism 240, and adds the determined non-operating cycle information to the control information C. The control instructor 24 outputs this control information C to the controller 12.

Alternatively, in place of the non-operating cycle information, time information (e.g. for cc seconds after CC seconds) regarding the time during which the conveyance operation will not be performed by the print conveyance mechanism 240 may also be included in the control information C. In the case of the print laminating apparatus 200, the number of seconds after which the film 214 conveyed by the film conveyance mechanism 210, in which the abnormality was detected, will arrive at the print conveyance mechanism 240 is known. Accordingly, the control instructor 24 determines the aforementioned time information and adds the determined time information to the control information C. The control instructor 24 outputs this control information C to the controller 12.

The controller 12 outputs the control information C to the print conveyance mechanism 240. As a result, the print conveyance mechanism 240 does not convey the print 242 during a cycle after $N_C$ cycles in accordance with the non-operating cycle information. Otherwise, the print conveyance mechanism 240 does not convey the print 242 for cc seconds after CC seconds in accordance with the time information.

By thus using a time difference from when the factor that is a change in the state of the film 214 is detected in the film conveyance mechanism 210 until when the print 242 to be adhered to the film 214 that has been adversely affected by this factor is conveyed by the print conveyance mechanism 240, the control information C for the abnormality handling processing is output to the print conveyance mechanism 240 during a period that corresponds to the time difference. As a result, the print 242 will not be adhered to the adversely affected film 214, and therefore, a malfunction can be avoided without stopping the print laminating apparatus 200. Thus, high availability of the print laminating apparatus 200 can be maintained.

Next, detection of vibrations of the conveyance shafts 216 in the film conveyance mechanism 210 in a case where the conveyance shafts 216 vibrate, and avoidance of a malfunction will be described as another example.

As shown in FIG. 1, in the control apparatus 10, the data acquirer 14 acquires data regarding the torque value of the servo of the conveyance shafts 216 in the film conveyance mechanism 210, and causes the data accumulator 16 to store the data.

If the torque value of the servo of the conveyance shafts 216 in the film conveyance mechanism 210 stored in the data accumulator 16 significantly differs from the value during normal operation, the abnormality determiner 22 determines that the conveyance shafts 216 are vibrating, and outputs, to the control instructor 24, a determination result that includes the location where the abnormality was detected (film conveyance mechanism 210), the abnormality content (vibrations of the conveyance shafts 216), and the time of occurrence.

The control instructor 24 determines, based on the causality information shown in FIG. 20, that a malfunction that is adhesion failure will occur in the adhesion mechanism 250, with the abnormality content (vibrations of the conveyance shafts 216) serving as a factor. Then, to avoid the determined malfunction, control information D for controlling the print conveyance mechanism 240 so as not to convey the print 242 is generated.

The control information D also includes non-operating cycle information, which defines the number of cycles of the print conveyance mechanism 240 after which control will be performed so as not to convey the print 242. For example, by providing a mark on the film 214 at each length that corresponds to a cycle, the number of cycles after which the print 242 will be conveyed in the print conveyance mechanism 240 for the film 214 conveyed by the film conveyance mechanism 210, in which the abnormality was detected, can be found. Accordingly, the control instructor 24 determines the non-operating cycle information that designates a cycle (e.g. cycle after ND cycles) during which the conveyance operation will not be performed by the print conveyance mechanism 240, and adds the determined non-operating cycle information to the control information D. The control instructor 24 outputs this control information D to the controller 12.

Alternatively, in place of the non-operating cycle information, time information (e.g. for dd seconds after DD seconds) regarding the time during which the conveyance operation will not be performed by the print conveyance mechanism 240 may also be included in the control information D. In the case of the print laminating apparatus 200, the number of seconds after which the film 214 conveyed by the film conveyance mechanism 210, in which the abnormality was detected, will arrive at the print conveyance mechanism 240 is known. Accordingly, the control instructor 24 determines the aforementioned time information and adds the determined time information to the control information D. The control instructor 24 outputs this control information D to the controller 12.

The controller 12 outputs the control information D to the print conveyance mechanism 240. As a result, the print conveyance mechanism 240 does not convey the print 242 during a cycle after ND cycles in accordance with the non-operating cycle information. Otherwise, the print conveyance mechanism 240 does not convey the print 242 for dd seconds after DD seconds in accordance with the time information.

By thus using a time difference from when the factor, i.e. vibrations of the conveyance shafts 216 is detected in the film conveyance mechanism 210 until when the print 242 to be adhered to the film 214 that has been adversely affected by this factor is conveyed by the print conveyance mechanism 240, the control information D for the abnormality handling processing is output to the print conveyance mechanism 240 during a period that corresponds to the time difference. As a result, the print 242 will not be adhered to the adversely affected film 214, and therefore, the malfunction can be avoided without stopping the print laminating apparatus 200. Thus, high availability of the print laminating apparatus 200 can be maintained.

Another Application Example 3: Window-Film Adhering Apparatus

Figure 21:
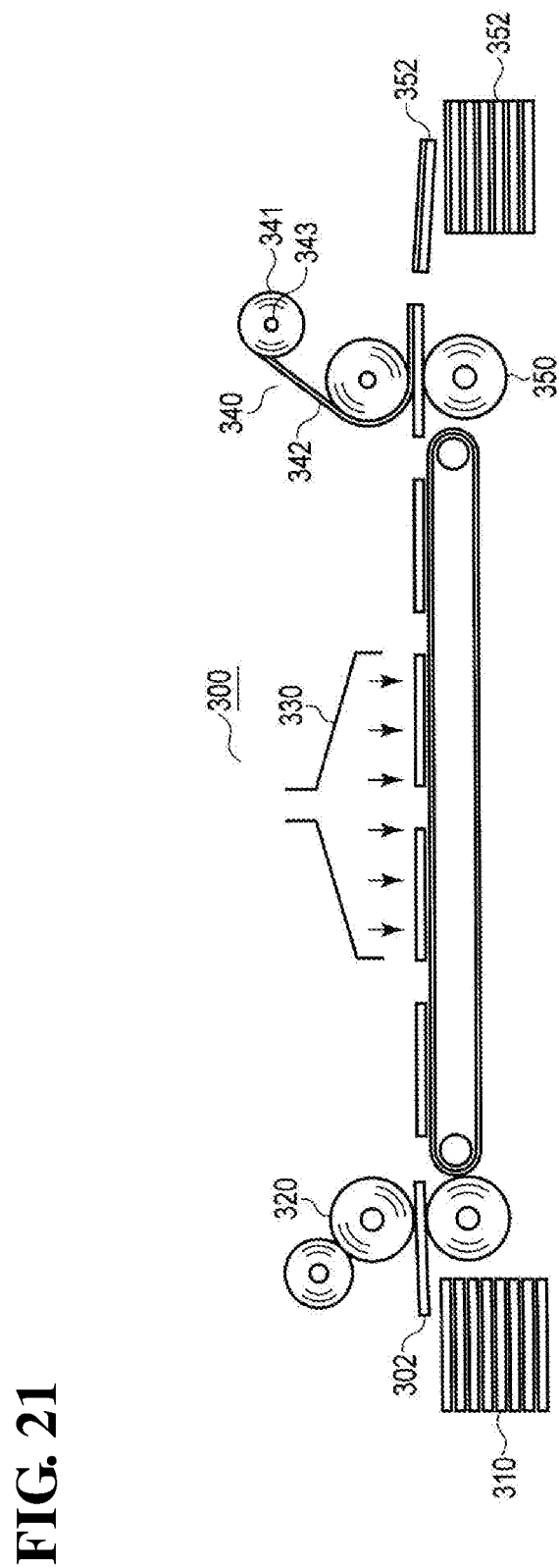
FIG. 21 is a schematic view illustrating a configuration example of a typical window-film adhering apparatus.

FIG. 21 is a schematic view showing a configuration example of a typical window-film adhering apparatus 300.

Window-film adhering refers to creating a window in a box and adhering a film to the window to form a package, and is a kind of laminating.

The window-film adhering apparatus 300 shown in FIG. 21 is constituted by a print conveyance mechanism 310 for supplying and conveying prints 302, an application mechanism 320 for applying an adhesive to the prints 302 that have been conveyed by the print conveyance mechanism 310, a drying mechanism 330 for drying the adhesive that has been applied to the prints 302 by the application mechanism 320, a film conveyance mechanism 340 for supplying and conveying a film 342, which is to be adhered to the prints 302 and is wound around a paper tube 341, and an adhesion mechanism 350 for adhering the prints 302 that have been dried by the drying mechanism 330 to the film 342 that has been conveyed by the film conveyance mechanism 340, and creating a finished product 352.

Figure 22:
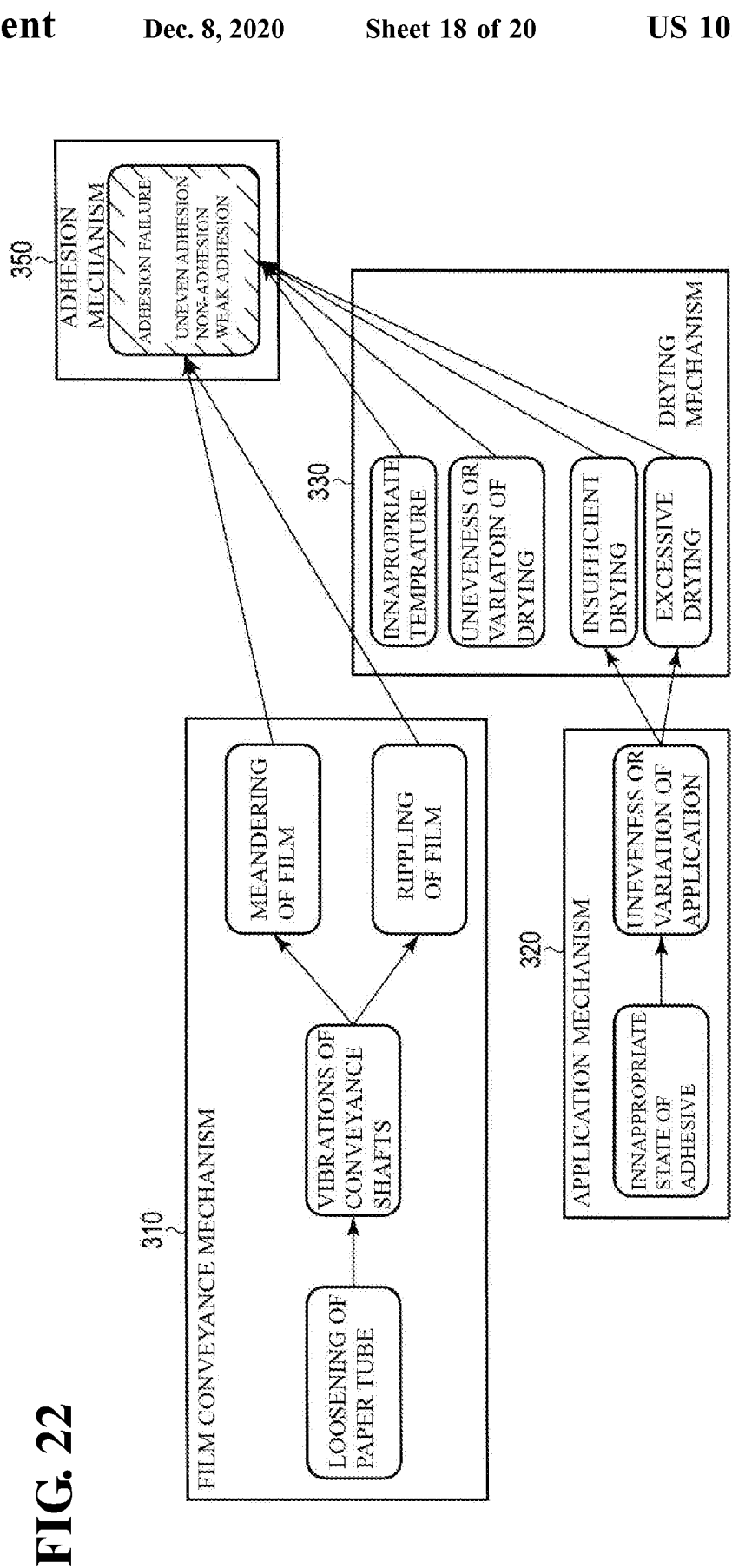
FIG. 22 is a diagram illustrating an example of causality information in a window-film adhering apparatus.

FIG. 22 shows an example of causality information in the window-film adhering apparatus 300 that has the above-described configuration.

It is indicated that a conveyance shaft 343 will vibrate, with loosening of the paper tube 341 in the film conveyance mechanism 340 serving as a factor, and meandering or rippling of the film 342 will then be caused, with the vibrations of the paper tube 341 serving as a factor, and ultimately, a malfunction that is an adhesion failure (e.g. uneven adhesion, adhesion inability, weak adhesion) will occur in the adhesion mechanism 350.

It is also indicated that unevenness or variation of application will be caused, with an inappropriate state of the adhesive in the application mechanism 320 serving as a factor, and insufficient drying or excessive drying in the drying mechanism 330 will then be caused, with the inappropriate state of the adhesive serving as a factor, and ultimately, a malfunction that is an adhesion failure will occur in the adhesion mechanism 350.

A description will be described below of detection of vibrations of the conveyance shaft 343 in the film conveyance mechanism 340 in a case where the conveyance shaft 343 vibrates, and avoidance of a malfunction.

As shown in FIG. 1, in the control apparatus 10, the data acquirer 14 acquires data regarding the torque value of a servo in the film conveyance mechanism 340, and causes the data accumulator 16 to store the data.

If the torque value of the servo in the film conveyance mechanism 340 stored in the data accumulator 16 significantly differs from a value during normal operation, the abnormality determiner 22 determines that the conveyance shaft 343 in the film conveyance mechanism 340 is vibrating, and outputs, to the control instructor 24, a determination result that includes the location where the abnormality was detected (film conveyance mechanism 340), the abnormality content (vibrations of the conveyance shaft 343), and the time of occurrence.

The control instructor 24 determines, based on the causality information shown in FIG. 22, that a malfunction that is adhesion failure will occur in the adhesion mechanism 350, with the abnormality content (vibrations of the conveyance shaft 343) serving as a factor. Then, to avoid the determined malfunction, control information E for controlling the adhesion mechanism 350 so as not to perform the adhesion is generated.

The control information E also includes non-operating cycle information, which defines the number of cycles of the adhesion mechanism 350 after which control will be performed so as not to perform the adhesion. For example, by providing a mark on the film 342 at each length that corresponds to a cycle, the number of cycles of the adhesion mechanism 350 after which the film 342 conveyed from the film conveyance mechanism 340 will be subjected to adhesion processing can be found. Accordingly, the control instructor 24 determines the non-operating cycle information that designates a cycle (e.g. cycle after $N_E$ cycles) during which the adhesion processing will not be performed by the adhesion mechanism 350, and adds the determined non-operating cycle information to the control information E. The control instructor 24 outputs this control information E to the controller 12.

Alternatively, in place of the non-operating cycle information, time information (e.g. for ee seconds after EE seconds) regarding the time during which the adhesion will not be performed by the adhesion mechanism 350 may also be included in the control information E. In the case of the window-film adhering apparatus 300, the number of seconds after which the film 342 conveyed by the film conveyance mechanism 340 will arrive at the adhesion mechanism 350 is known. Accordingly, the control instructor 24 determines the aforementioned time information and adds the determined time information to the control information E. The control instructor 24 outputs this control information E to the controller 12.

The controller 12 outputs the control information E to the adhesion mechanism 350. As a result, the adhesion mechanism 350 does not perform adhesion during a cycle after $N_E$ cycles in accordance with the non-operating cycle information. Otherwise, the adhesion mechanism 350 does not perform adhesion for ee seconds after EE seconds in accordance with the time information.

By thus using a time difference from when the factor, i.e. vibrations of the conveyance shaft 343 is detected in the film conveyance mechanism 340 until when a print 302 is adhered to the film 342 that has been adversely affected by this factor, the control information E for the abnormality handling processing is output to the adhesion mechanism 350 during a period that corresponds to the time difference.

As a result, the print 302 will not be adhered to the adversely affected film 342, and therefore, the malfunction can be avoided without stopping the window-film adhering apparatus 300. Thus, high availability of the window-film adhering apparatus 300 can be maintained.

Next, detection of unevenness or variation of application in the application mechanism 320 in a case where unevenness or variation of application has occurred, and avoidance of a malfunction will be described as another example.

As shown in FIG. 1, in the control apparatus 10, the data acquirer 14 acquires data regarding the torque value of a servo in the application mechanism 320, and causes the data accumulator 16 to store the data.

If the torque value of the servo in the application mechanism 320 stored in the data accumulator 16 significantly differs from the value during normal operation, the abnormality determiner 22 determines that unevenness or variation of application has occurred, and outputs, to the control instructor 24, a determination result that includes the location where the abnormality was detected (application mechanism 320), the abnormality content (vibrations or variation of application), and the time of occurrence.

The control instructor 24 determines, based on the causality information shown in FIG. 22, that a malfunction that is adhesion failure will occur in the adhesion mechanism 350, with the abnormality content (unevenness or variation of application) serving as a factor. Then, to avoid the determined malfunction, control information F for controlling the adhesion mechanism 350 so as not to perform the adhesion is generated.

The control information F also includes non-operating cycle information, which defines the number of cycles of the adhesion mechanism 350 after which control will be performed so as not to perform the adhesion. For example, by providing a mark on the film 342 at each length that corresponds to a cycle, the number of cycles of the adhesion mechanism 350 after which the print 302 conveyed from the application mechanism 320 will be subjected to an adhesion process can be found. Accordingly, the control instructor 24 determines the non-operating cycle information that designates a cycle (e.g. cycle after $N_F$ cycles) during which the adhesion will not be performed by the adhesion mechanism 350, and adds the determined non-operating cycle information to the control information F. The control instructor 24 outputs this control information F to the controller 12.

Alternatively, in place of the non-operating cycle information, time information (e.g. for ff seconds after FF seconds) regarding the time during which the adhesion will not be performed by the adhesion mechanism 350 may also be included in the control information F. In the case of the window-film adhering apparatus 300, the number of seconds after which the print 302 conveyed from the application mechanism 320 will arrive at the adhesion mechanism 350 is known. Accordingly, the control instructor 24 determines the aforementioned time information and adds the determined time information to the control information F. The control instructor 24 outputs this control information F to the controller 12.

The controller 12 outputs the control information F to the adhesion mechanism 350. As a result, the adhesion mechanism 350 does not perform adhesion during a cycle after $N_F$ cycles in accordance with the non-operating cycle information. Otherwise, the adhesion mechanism 350 does not perform adhesion for ff seconds after FF seconds in accordance with the time information.

By thus using a time difference from when the factor that is unevenness or variation of application is detected in the application mechanism 320 until when the film 342 is adhered to the print 302 that has been adversely affected by this factor, the control information F for the abnormality handling processing is output to the adhesion mechanism 350 during a period that corresponds to the time difference. As a result, the film 342 will not be adhered to the adversely affected print 302, and therefore, the malfunction can be avoided without stopping the window-film adhering apparatus 300. Thus, high availability of the window-film adhering apparatus 300 can be maintained.

Another Application Example 4: Assembly Apparatus

Figure 23:
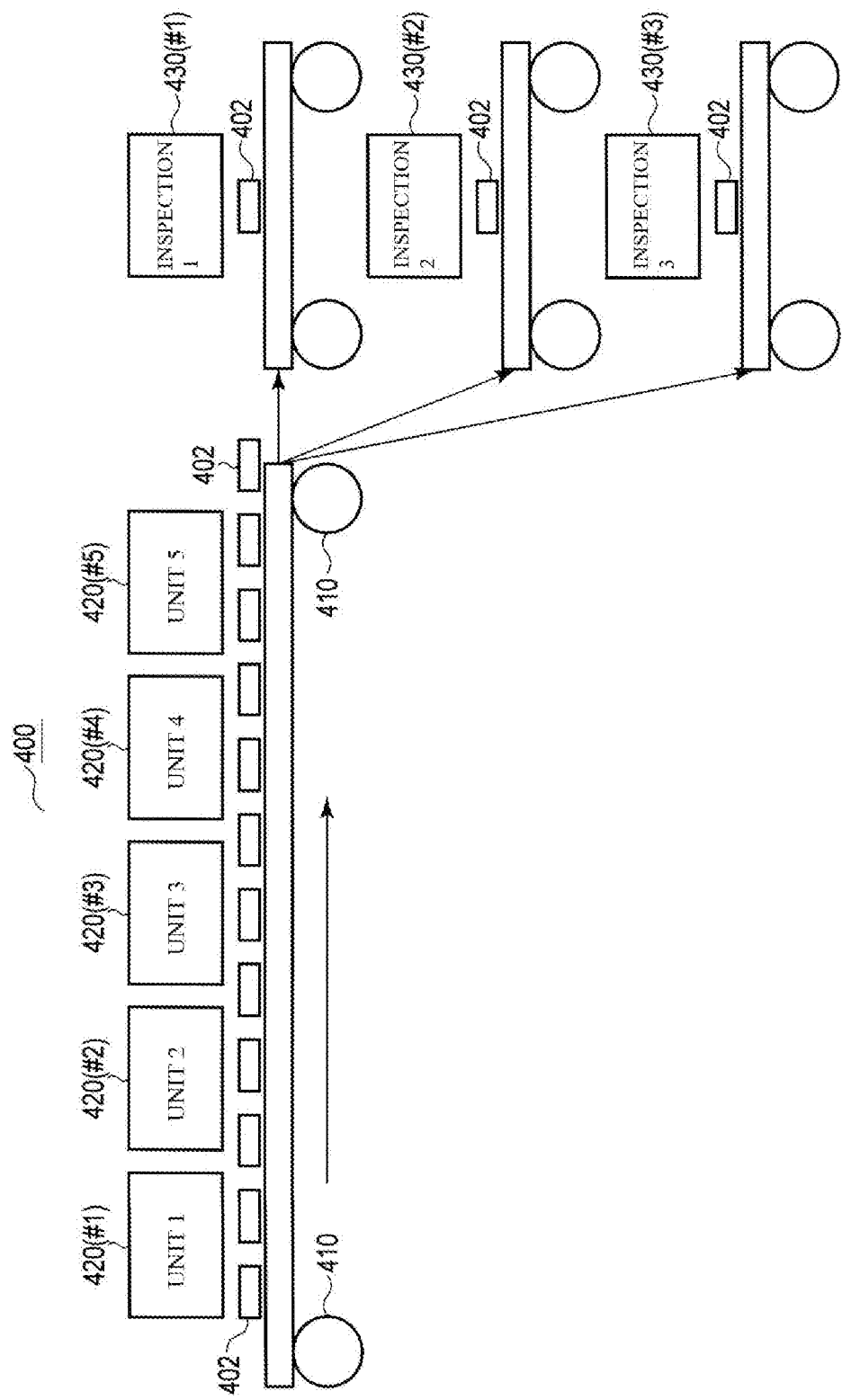
FIG. 23 is a schematic view illustrating a configuration example of an assembly apparatus

FIG. 23 is a schematic view showing a configuration example of an assembly apparatus 400.

The assembly apparatus 400 shown in FIG. 23 is constituted by a conveyance mechanism 410 for conveying workpieces 402 toward downstream units, an assembly mechanism 420 (#1) for implementing a unit 1 for the workpieces 402 conveyed by the conveyance mechanism 410, an assembly mechanism 420 (#2) for implementing a unit 2 for the workpieces 402 after the unit 1, an assembly mechanism 420 (#3) for implementing a unit 3 for the workpieces 402 after the unit 2, an assembly mechanism 420 (#4) for implementing a unit 4 for the workpieces 402 after the unit 3, an assembly mechanism 420 (#5) for implementing a unit 5 for the workpieces 402 after the unit 4, and inspection mechanisms 430 (#1) to (#3) for performing inspection 1, inspection 2, and inspection 3 on the workpieces 402 after the unit 5.

The workpieces 402 that have been subjected to the unit 5 are transferred to any of the inspection mechanisms 430 (#1) to (#3) by a transferring means other than the conveyance mechanism 410.

Figure 24:
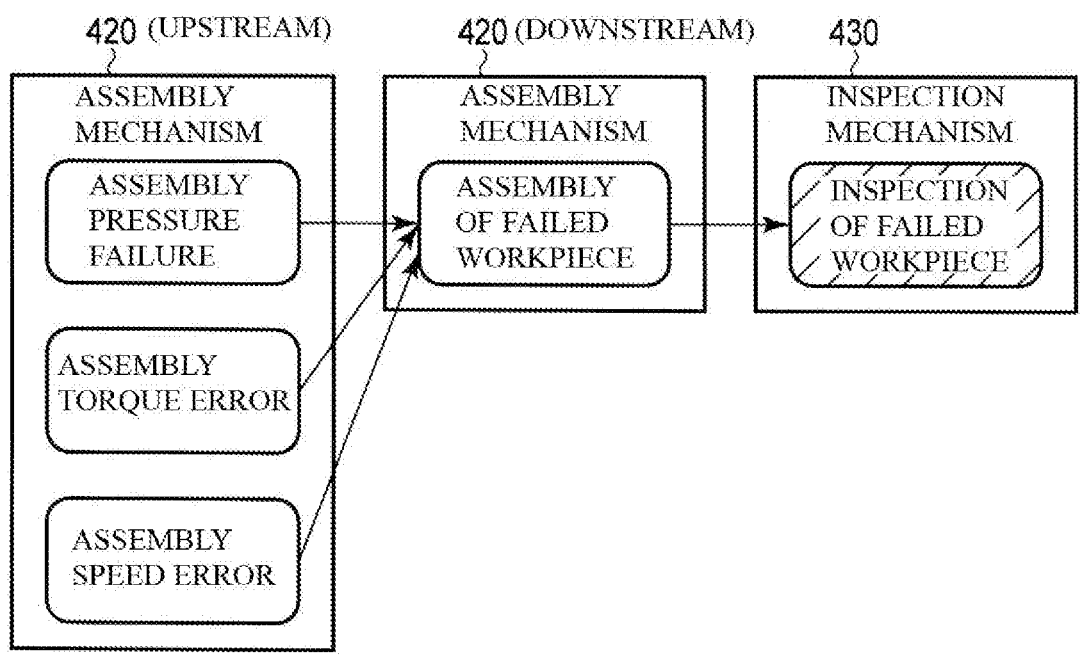
FIG. 24 is a diagram illustrating an example of causality information in an assembly apparatus.

FIG. 24 shows an example of causality information in the assembly apparatus 400 that has the above-described configuration.

If an assembly pressure failure, an assembly torque error, or an assembly speed error occurs in any of the assembly mechanisms 420 (#1) to (#5), this serves as a factor leading to a failed workpiece being assembled in the subsequent assembly mechanisms 420, and then, this serves as a factor leading to a malfunction in which the failed workpiece is inspected in the inspection mechanisms 430 (#1) to (#3).

A description will be given below of a first example of detection of assembly pressure failure in a case where assembly pressure failure has occurred on a workpiece 402, and avoidance of a malfunction.

If the assembly pressure failure has occurred in any of the assembly mechanisms 420 (#1) to (#5), the torque of a servo in the corresponding assembly mechanism 420 significantly differs from the value during normal operation.

As shown in FIG. 1, in the control apparatus 10, the data acquirer 14 acquires data regarding the torque values of servos in the assembly mechanisms 420 (#1) to (#5), and causes the data accumulator 16 to store the data.

If the abnormality determiner 22 finds a torque value that significantly differs from the torque value during normal operation from among the torque values stored in the data accumulator 16, the abnormality determiner 22 determines that an assembly pressure failure has occurred in the corresponding assembly mechanism 420, and outputs, to the control instructor 24, a determination result that includes the location where the abnormality was detected (e.g. assembly mechanism 420 (#1)), the abnormality content (assembly pressure failure), and the time of occurrence.

The control instructor 24 determines, based on the causality information shown in FIG. 24, that the failed workpiece will be assembled, with the abnormality content (assembly pressure failure) serving as a factor, and a malfunction in which the failed workpiece is inspected will occur in any of the inspection mechanisms 430 (#1) to (#3), with the assembly of the failed workpiece serving as a factor. Then, to avoid the determined malfunction, control information is generated for instructing the assembly mechanisms 420 located on the downstream side of the assembly mechanism 420 in which the abnormality was detected, to not assemble the failed workpiece.

This control information also includes non-operating cycle information, which defines the number of cycles of the downstream assembly mechanisms 420 after which the assembly operation will not be performed. The number of cycles of the respective downstream assembly mechanisms 420 after which a failed workpiece discharged from a certain assembly mechanism 420 will be assembled, is known. Accordingly, the control instructor 24 determines, for the respective downstream assembly mechanisms 420, the non-operating cycle information that designates a cycle during which the assembly processing will not be performed by the respective downstream assembly mechanisms 420, and adds the determined non-operating cycle information to the control information. The control instructor 24 outputs this control information to the controller 12.

Alternatively, in place of the non-operating cycle information, time information regarding the time during which the assembly processing will not be performed by the respective assembly mechanisms 420 may also be included in the control information. The time taken until a failed workpiece discharged from a certain assembly mechanism 420 is conveyed to the respective downstream assembly mechanisms 420 is known. Accordingly, the control instructor 24 determines the aforementioned time information for the respective downstream assembly mechanisms 420, and adds the determined time information to the control information. The control instructor 24 outputs this control information to the controller 12.

The controller 12 outputs the control information to the corresponding assembly mechanisms 420. As a result, the downstream assembly mechanisms 420 will not assemble the failed workpiece during the cycle designated in the non-operating cycle information. Otherwise, the downstream assembly mechanisms 420 will not assemble the failed workpiece at the time designated in the time information.

By thus using a time difference from when a factor that is assembly pressure failure is detected in any of the assembly mechanisms 420 until a failed workpiece is conveyed to the downstream assembly mechanisms 420, the control information for the abnormality handling processing is output to the downstream assembly mechanisms 420 during a period that corresponds to the time difference. As a result, the failed workpiece will not be needlessly assembled, and therefore, the malfunction can be avoided without stopping the assembly apparatus 400. Thus, high availability of the assembly apparatus 400 can be maintained.

Next, a description will be given of a second example of detection of assembly pressure failure in a case where an assembly pressure failure has occurred on a workpiece 402, and avoidance of a malfunction.

In the above-described first example, if a failed workpiece is detected, control is performed so as not to cause the subsequent assembly mechanisms 420 to perform the assembly operation, and thus the malfunction is avoided. Meanwhile, in the second example, even if a failed workpiece is detected, the subsequent assembly mechanisms 420 are not controlled (i.e. the subsequent assembly mechanisms 420 implement the assembly units for the failed workpiece as in the normal operations), whereas the inspection mechanisms 430 (#1) to (#3) are controlled so as not to inspect the failed workpiece.

If the assembly pressure failure has occurred in any of the assembly mechanisms 420 (#1) to (#5), the torque of a servo in the corresponding assembly mechanism 420 significantly differs from the value during normal operation.

As shown in FIG. 1, in the control apparatus 10, the data acquirer 14 acquires data regarding the torque values of servos in the assembly mechanisms 420 (#1) to (#5), and causes the data accumulator 16 to store the data.

If the abnormality determiner 22 finds a torque value that significantly differs from the torque value during normal operation from among the torque values stored in the data accumulator 16, the abnormality determiner 22 determines that an assembly pressure failure has occurred in the corresponding assembly mechanism 420, and outputs, to the control instructor 24, a determination result that includes the location where the abnormality was detected (e.g. assembly mechanism 420 (#2)), the abnormality content (assembly pressure failure), and the time of occurrence.

The control instructor 24 determines, based on the causality information shown in FIG. 24, that the failed workpiece will be assembled, with the abnormality content (assembly pressure failure) serving as a factor, and a malfunction in which the failed workpiece will be inspected will occur in any of the inspection mechanisms 430 (#1) to (#3), with the assembly of the failed workpiece serving as a factor. Then, to avoid this malfunction, control information for instructing the inspection mechanisms 430 (#1) to (#3) to not inspect the failed workpiece is generated.

This control information also includes non-operating cycle information, which defines the number of cycles of the respective inspection mechanisms 430 (#1) to (#3) after which the inspection will not be performed. The number of cycles of the respective inspection mechanisms 430 (#1) to (#3) after which failed workpieces from the assembly mechanisms 420 (#1) to (#5) will be inspected is known. Accordingly, the control instructor 24 determines, for the respective inspection mechanisms 430 (#1) to (#3), the non-operating cycle information that designates a cycle during which inspection will not be performed by the respective inspection mechanisms 430 (#1) to (#3), and adds the determined non-operating cycle information to the control information. The control instructor 24 outputs this control information to the controller 12.

Alternatively, in place of the non-operating cycle information, time information regarding the time during which a failed workpiece will be conveyed to the inspection mechanisms 430 (#1) to (#3) may also be included in the control information. The time during which failed workpieces from the respective assembly mechanisms 420 (#1) to (#5) are conveyed to the inspection mechanisms 430 (#1) to (#3) is known. Accordingly, the control instructor 24 determines the aforementioned time information and adds the determined time information to the control information. The control instructor 24 outputs this control information to the controller 12.

The controller 12 outputs the control information to the inspection mechanisms 430 (#1) to (#3). As a result, the inspection mechanisms 430 (#1) to (#3) do not inspect the failed workpiece during the cycle designated in the non-operating cycle information. Otherwise, the inspection mechanisms 430 (#1) to (#3) will not inspect the failed workpiece at the time designated in the time information.

By thus using a time difference from when a factor that is an assembly pressure failure is detected in the assembly mechanism 420 until when a failed workpiece is conveyed to the respective inspection mechanisms 430 (#1) to (#3), the control information for the abnormality handling processing is output to the inspection mechanisms 430 (#1) to (#3) during a period that corresponds to the time difference. As a result, the failed workpiece will not be needlessly inspected in the inspection mechanisms 430 (#1) to (#3), and accordingly, a malfunction can be avoided without stopping the assembly apparatus 400. Thus, high availability of the assembly apparatus 400 can be maintained.

As described in the above application examples, the control apparatus 10 to which the control method according to one or more embodiments is applied is also applicable to the vertical pillow packaging machine 100, the print laminating apparatus 200, the window-film adhering apparatus 300, and the assembly apparatus 400, but the scope of application of the control apparatus 10 is not limited thereto. Thus, in these apparatuses as well, it is possible to determine the location where an abnormality was detected, the abnormality content, and the time of occurrence, and determine a malfunction that will be caused by this abnormality content, based on the causality information. Furthermore, the abnormality handling processing for avoiding the malfunction can also be performed.

As described above, the control apparatus 10 to which the control method according to one or more embodiments is applied is applicable to various production apparatuses or manufacturing apparatuses. Even if an abnormality is detected in these production apparatuses or manufacturing apparatuses, a malfunction can be avoided without stopping the production apparatuses or manufacturing apparatuses. Accordingly, high availability of the production apparatuses or manufacturing apparatuses can be maintained.

Although the best modes for carrying out the present invention have been described with reference to the attached drawings, the present invention is not limited to the above-described configurations. A person skilled in the art may conceive various modifications and variations within the scope of the invented technical ideas described in the appended patent claims, and those modifications and variations are also understood to be encompassed in the technical scope of the present invention.

(Note 1)

An industrial control apparatus for controlling a production apparatus that performs processing for sequentially producing an item to be produced through a plurality of units that are arranged in a line from an upstream side toward a downstream side, the industrial control apparatus including:

a hardware processor, wherein the hardware processor is configured to:

acquire a physical quantity that represents a state of processing in a unit that is subjected to monitoring, of the plurality of units, for each cycle, the cycle being defined as unit processing time of processing performed by each of the plurality of units;

determine occurrence of an abnormality in the unit that is subjected to monitoring, based on the acquired physical quantity or a feature value that is extracted from the physical quantity; and specify, in a case where it is determined that an abnormality occurs in the unit that is subjected to monitoring, a cycle during which a downstream unit performs processing on an item to be produced that is affected by the abnormality, and perform control so that abnormality handling processing is performed as processing in the specified cycle by the downstream unit.

(Note 2)

A packaging machine control apparatus for controlling a packaging machine that performs processing for sequentially packaging an item to be produced through a plurality of units that are arranged in a line from an upstream side toward a downstream side, the packaging machine control apparatus including:

a hardware processor, wherein the hardware processor is configured to:

acquire a physical quantity that represents a state of processing in a unit that is subjected to monitoring, of the plurality of units, for each cycle, the cycle being defined as a unit of processing time of processing performed by each of the plurality of units;

determine occurrence of an abnormality in the unit that is subjected to monitoring, based on the acquired physical quantity or a feature value that is extracted from the physical quantity; and specify, in a case where it is determined that an abnormality occurs in the unit that is subjected to monitoring, a cycle during which a downstream unit performs processing on an item to be produced that is affected by the abnormality, and perform control so that abnormality handling processing is performed as processing in the specified cycle by the downstream unit.

(Note 3)

A control method to be performed using a hardware processor by an industrial control apparatus for controlling a production apparatus that performs processing for sequentially producing an item to be produced through a plurality of units that are arranged in a line from an upstream side toward a downstream side, the control method including:

acquiring a physical quantity that represents a state of processing in a unit that is subjected to monitoring, of the plurality of units, for each cycle, the cycle being defined as unit processing time of processing performed by each of the plurality of units;

determining occurrence of an abnormality in the unit that is subjected to monitoring, based on the acquired physical quantity or a feature value that is extracted from the physical quantity; and specifying, in a case where it is determined that an abnormality occurs in the unit that is subjected to monitoring, a cycle in which a downstream unit performs processing on an item to be produced that is affected by the abnormality, and performing control so that abnormality handling processing is performed as processing in the specified cycle by the downstream unit.

The invention claimed is:

1. An industrial control apparatus for controlling a production apparatus that performs processing for sequentially producing an item to be produced through a plurality of units that are arranged in a line from an upstream side toward a downstream side, the industrial control apparatus comprising a processor configured with a program to perform operations comprising:

operation as a physical quantity acquirer configured to acquire, for each of a plurality of cycles, a physical quantity that represents a state of processing in a unit, among the plurality of units, monitored by the physical quantity acquirer;

operation as an abnormality determiner configured to determine an occurrence of an abnormality in the unit monitored by the physical quantity acquirer based on: the acquired physical quantity; or a feature value that is extracted from the acquired physical quantity; and operation as a control instructor configured to:

in response to the abnormality determiner determining that an abnormality has occurred in the unit monitored by the physical quantity acquirer, specify, based on causality information corresponding to the determined abnormality, the causality information specifying a malfunction occurring in a downstream unit performing processing on the item to be produced after a predetermined number of cycles following the occurrence of the abnormality, a cycle during which the downstream unit would experience the malfunction caused by the abnormality; and perform control so that the downstream unit performs abnormality handling processing in the specified cycle.

2. The industrial control apparatus according to claim 1, wherein the processor is configured with the program to perform operations further comprising:

operation as a storage configured to store, in response to a plurality of units being monitored by the physical quantity acquirer, cycle-specific information for specifying a cycle, occurring after a predetermined number of cycles following the occurrence of the abnormality, during which the downstream unit performing processing on the item to be produced would experience the malfunction caused by the abnormality, in association with each of the plurality of units that are monitored by the physical quantity acquirer, wherein the processor is configured with the program to perform operations such that operation as the control instructor comprises operation as the control instructor that:

in response to the abnormality determiner determining that an abnormality has occurred in one of the plurality of units that are monitored by the physical quantity acquirer, reads out, from the storage, the cycle-specific information that corresponds to the unit in which the abnormality occurred; and performs control based on the cycle-specific information so that the downstream unit performs abnormality handling processing in the specified cycle.

3. A packaging machine control apparatus for controlling a packaging machine that performs processing for sequentially packaging an item to be produced through a plurality of units that are arranged in a line from an upstream side toward a downstream side, the packaging machine control apparatus comprising a processor configured with a program to perform operations comprising:

operation as a physical quantity acquirer configured to acquire, for each of a plurality of cycles, a physical quantity that represents a state of processing in a unit, among the plurality of units, monitored by the physical quantity acquirer;

operation as an abnormality determiner configured to determine occurrence of an abnormality in the unit monitored by the physical quantity acquirer based on: the acquired physical quantity; or a feature value that is extracted from the acquired physical quantity; and operation as a control instructor configured to:

in response to the abnormality determiner determining that an abnormality has occurred in the unit monitored by the physical quantity acquirer, specify, based on causality information corresponding to the determined abnormality, the causality information specifying a malfunction occurring in a downstream unit performing processing on the item to be produced after a predetermined number of cycles following the occurrence of the abnormality, a cycle during which the downstream unit would experience the malfunction caused by the abnormality; and perform control so that the downstream unit performs abnormality handling processing in the specified cycle.

4. A control method to be performed by an industrial control apparatus for controlling a production apparatus that performs processing for sequentially producing an item to be produced through a plurality of units that are arranged in a line from an upstream side toward a downstream side, the method comprising:

acquiring, for each of a plurality of cycles, a physical quantity that represents a state of processing in a monitored unit, among the plurality of units;

determining occurrence of an abnormality in the monitored unit based on: the acquired physical quantity; or a feature value that is extracted from the acquired physical quantity; and in response to determining that an abnormality has occurred in the monitored unit, specifying, based on causality information corresponding to the determined abnormality, the causality information specifying a malfunction occurring in a downstream unit performing processing on the item to be produced after a predetermined number of cycles following the occurrence of the abnormality, a cycle during which a downstream unit would experience the malfunction caused by the abnormality; and performing control so that the downstream unit performs abnormality handling processing in the specified cycle.

5. A non-transitory computer-readable storage medium storing the program with which the processor is configured to cause the processor to perform the operations of the industrial control apparatus according to claim 1.

6. A non-transitory computer-readable storage medium storing the program with which the processor is configured to cause the processor to perform the operations of the industrial control apparatus according to claim 2.

7. A packaging machine comprising the industrial control apparatus according to claim 1, the packaging machine comprising the production apparatus that is controlled by the industrial control apparatus.

8. A packaging machine comprising the industrial control apparatus according to claim 2, the packaging machine comprising the production apparatus that is controlled by the industrial control apparatus.

9. The control method according to claim 4, further comprising:

storing, in response to the monitored unit comprising a plurality of monitored units, cycle-specific information for specifying a cycle, occurring after a predetermined number of cycles following the occurrence of the abnormality, during which the downstream unit performing processing on the item to be produced would experience the malfunction caused by the abnormality, in association with each of the plurality of monitored units; and reading out, in response to determining that the abnormality has occurred in one of the plurality of monitored units, the cycle-specific information that corresponds to the unit in which the abnormality occurred, wherein performing control so that the downstream unit performs abnormality handling processing in the specified cycle comprises performing control based on the cycle-specific information so that the downstream unit performs abnormality handling processing in the specified cycle.

* * * * *